United States Patent
Park et al.

(10) Patent No.: US 10,299,231 B2
(45) Date of Patent: May 21, 2019

(54) SYNCHRONIZATION METHOD AND APPARATUS FOR WIRELESS COMMUNICATION BETWEEN ELECTRONIC DEVICES

(71) Applicant: Samsung Electronics Co., Ltd., Gyeonggi-do (KR)

(72) Inventors: Seunghoon Park, Seoul (KR); Hyunseok Ryu, Gyeonggi-do (KR); Sangkyu Baek, Gyeonggi-do (KR); Chiwoo Lim, Gyeonggi-do (KR); Kyungkyu Kim, Gyeonggi-do (KR); Youngbin Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/025,529

(22) PCT Filed: Sep. 25, 2014

(86) PCT No.: PCT/KR2014/008979
§ 371 (c)(1),
(2) Date: Mar. 28, 2016

(87) PCT Pub. No.: WO2015/046925
PCT Pub. Date: Apr. 2, 2015

(65) Prior Publication Data
US 2016/0212718 A1   Jul. 21, 2016

(30) Foreign Application Priority Data

Sep. 27, 2013  (KR) .................. 10-2013-0115738
Oct. 31, 2013  (KR) .................. 10-2013-0131698

(51) Int. Cl.
*H04W 4/06*     (2009.01)
*H04W 56/00*    (2009.01)

(52) U.S. Cl.
CPC ........... *H04W 56/001* (2013.01); *H04W 4/06* (2013.01); *H04W 56/00* (2013.01)

(58) Field of Classification Search
None
See application file for complete search history.

(56) References Cited

U.S. PATENT DOCUMENTS

2012/0257601 A1* 10/2012 Kim .................. H04L 5/001
                                                 370/336
2012/0320776 A1* 12/2012 Lim .................... H04W 56/002
                                                 370/252

(Continued)

FOREIGN PATENT DOCUMENTS

WO   WO 2013/002688 A1    1/2013
WO   WO 2013/066126 A1    5/2013

(Continued)

OTHER PUBLICATIONS

International Search Report dated Jan. 2, 2015 in connection with International Application No. PCT/KR2014/008979; 5 pages.

(Continued)

*Primary Examiner* — Chirag G Shah
*Assistant Examiner* — Srinivasa R Reddivalam

(57) ABSTRACT

The present invention relates to a method and apparatus for synchronization between electronic devices and, more particularly, to a synchronization method and apparatus for wireless communication between electronic devices. As a synchronization method for an electronic device performing wireless communication with other electronic devices, the method may include: checking, when two or more reference synchronization signals are received within a preset period, whether the received reference synchronization signals are synchronized; determining, when the received reference synchronization signals are not synchronized, to operate as a device sending a reference synchronization signal of a (Continued)

class lower than or equal to that of the lowest class reference synchronization signal among the received reference synchronization signals; sending a reference synchronization signal at a preset time in a synchronization frame designed to preserve temporal orthogonality between classes; and performing synchronization between reference synchronization signals in cooperation with different devices having sent reference synchronization signals.

20 Claims, 26 Drawing Sheets

(56) References Cited

U.S. PATENT DOCUMENTS

| | | | | |
|---|---|---|---|---|
| 2013/0089067 A1* | 4/2013 | Ji | ............ | H04W 56/00 370/330 |
| 2013/0121249 A1* | 5/2013 | Ji | ............ | H04W 4/001 370/328 |
| 2013/0170470 A1* | 7/2013 | Kneckt | ............ | H04W 48/08 370/330 |
| 2014/0056220 A1* | 2/2014 | Poitau | ............ | H04W 40/246 370/328 |
| 2014/0099950 A1 | 4/2014 | Mildh et al. | | |
| 2014/0269641 A1 | 9/2014 | Jang et al. | | |
| 2014/0321452 A1 | 10/2014 | Choi et al. | | |

FOREIGN PATENT DOCUMENTS

| WO | WO 2013/081393 A1 | 6/2013 |
|---|---|---|
| WO | WO 2013/122432 A1 | 8/2013 |

OTHER PUBLICATIONS

Written Opinion of the International Searching Authority dated Jan. 2, 2015 in connection with International Application No. PCT/KR2014/008979; 5 pages.

* cited by examiner

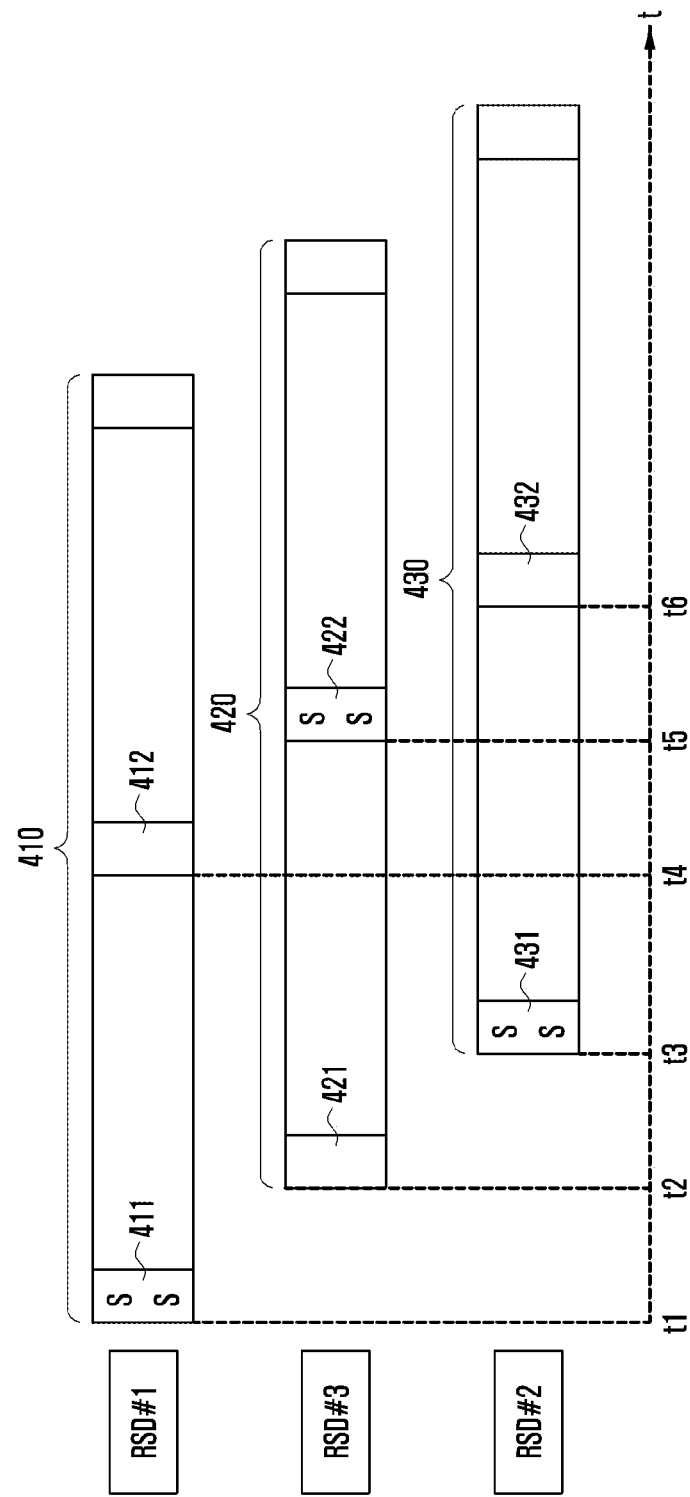

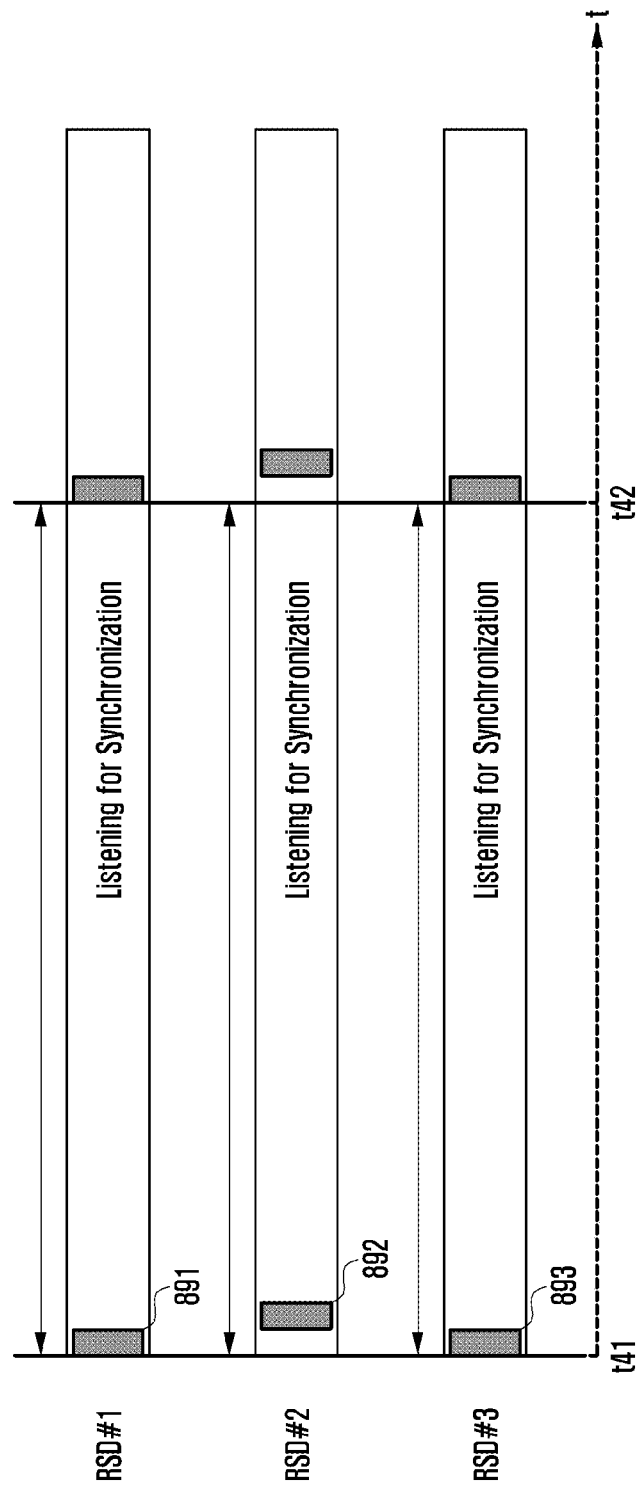

SYNCHRONIZATION METHOD AND APPARATUS FOR WIRELESS COMMUNICATION BETWEEN ELECTRONIC DEVICES

CROSS-REFERENCE TO RELATED APPLICATIONS AND CLAIM OF PRIORITY

The present application claims priority under 35 U.S.C. § 365 to International Patent Application No. PCT/KR2014/008979 filed Sep. 25, 2014, entitled "SYNCHRONIZATION METHOD AND APPARATUS FOR WIRELESS COMMUNICATION BETWEEN ELECTRONIC DEVICES", and, through International Patent Application No. PCT/KR2014/008979, to Korean Patent Application No. 10-2013-0115738 filed Sep 27, 2013 and to Korean Patent Application No. 10-2013-0131698 filed on Oct. 31, 2013, each of which are incorporated herein by reference into the present disclosure as if fully set forth herein.

TECHNICAL FIELD

The present invention relates to a method and apparatus for synchronization between electronic devices and, more particularly, to a synchronization method and apparatus for wireless communication between electronic devices.

BACKGROUND

With popularization of smartphones in recent years, data traffic has rapidly increased. According to the Korea Communications Commission, accelerated popularization of smartphones has caused mobile data traffic to triple in the last year. As the number of users for smartphones will further increase and application services thereof will be more activated, data traffic is expected to increase even more in the future. In particular, when machine-to-machine communication (or the Internet of Things), which may encompass communication between humans and things and communication between things beyond communication between humans, is activated as new mobile commerce applications, it is expected that traffic passing through base stations will increase explosively in an unmanageable way.

Recently, direct communication between devices, known as device-to-device (D2D) communication, has attracted attention as a technology to solve the above problem. D2D communication may be enabled in both licensed bands for mobile communication and unlicensed bands for wireless LANs.

In particular, D2D communication combined with mobile communication may increase the traffic capacity of base stations and decrease overload thereof. By use of D2D communication, electronic devices or user equipments (UEs) in the same cell or neighbor cells may establish a D2D link between them and exchange data through the D2D link without passing through the base station or evolved Node B (eNB), contributing to halving the number of links to traverse (from two to one).

In the case of researches about unlicensed bands, the main object is to identify communication demands occurring between humans, between humans and things, and between things, and handle traffic arising in local regions in a suitable way while preventing unnecessary waste of radio resources. Thus, current researches focus on schemes that enable many proximate devices to broadcast and receive information about services and content items in an efficient manner.

It is required to establish synchronization between devices to control D2D communication. A device may establish synchronization with another device by use of timing information received from synchronous eNB or through a GPS (Global Positioning System) receiving module. In this synchronization scheme, the device should have access to a synchronous eNB or GPS module. However, a network operator may not support a synchronous eNB depending upon the communication mode. In this case, the device may fail to establish synchronization because it cannot obtain timing information from the synchronous eNB. Additionally, when the device is placed in a GPS shadow area (e.g. between high-rise buildings, tunnel, indoor site of a building), it may fail to establish synchronization because it cannot obtain timing information from the GPS. In other words, the device may fail to initiate D2D communication when the connection to a synchronous eNB or GPS receiving module is not good.

SUMMARY

The present invention has been made in view of the above problems. Accordingly, an aspect of the present invention is to provide a synchronization method and apparatus for wireless communication between electronic devices.

Another aspect of the present invention is to provide a method and apparatus that achieve synchronization between electronic devices for wireless communication in a manner independent of an absolute synchronization system such as a synchronous base station or GPS.

Another aspect of the present invention is to provide a method and apparatus that achieve synchronization between electronic devices for wireless communication in a centralized manner or in a distributed manner.

In accordance with an aspect of the present invention, there is provided a method of synchronization for an electronic device performing wireless communication with other electronic devices. The method may include: checking, when two or more reference synchronization signals are received within a preset period, whether the received reference synchronization signals are synchronized; determining, when the received reference synchronization signals are not synchronized, to operate as a device sending a reference synchronization signal of a class lower than or equal to that of the lowest class reference synchronization signal among the received reference synchronization signals; sending, upon determining to operate as a device sending a reference synchronization signal, a reference synchronization signal at a preset time in a synchronization frame designed to preserve temporal orthogonality between classes; and performing synchronization between reference synchronization signals in cooperation with different devices having sent reference synchronization signals.

In accordance with another aspect of the present invention, there is provided a method of synchronization for an electronic device performing wireless communication with other electronic devices. The method may include: sending a reference synchronization signal at one of preset points in time in a synchronization frame designed to preserve temporal orthogonality between classes; sending, when an asynchronization indication indicating a mismatch between the reference synchronization signal and a reference synchronization signal sent by a second device is received from a third device, an asynchronization confirmation to the third device; and performing synchronization together with the third device in a network-distributed manner.

In accordance with another aspect of the present invention, there is provided an apparatus of synchronization for an electronic device performing wireless communication with other electronic devices. The apparatus may include: a communication unit to perform wireless communication with different devices and to send a reference synchronization signal; and a control unit to control the communication unit.

When communication with other devices is needed, the control unit may check, when two or more reference synchronization signals are received through the communication unit within a preset period, whether the received reference synchronization signals are synchronized, determine, when the received reference synchronization signals are not synchronized, to operate as a device sending a reference synchronization signal of a class lower than or equal to that of the lowest class reference synchronization signal among the received reference synchronization signals, control, upon determining to operate as a device sending a reference synchronization signal, the communication unit to send a reference synchronization signal at a preset time in a synchronization frame designed to preserve temporal orthogonality between classes, and perform synchronization between reference synchronization signals in cooperation with different devices having sent reference synchronization signals.

In accordance with another aspect of the present invention, there is provided an apparatus of synchronization an electronic device performing wireless communication with other electronic devices. The apparatus may include: a communication unit to perform wireless communication with different devices and to send a reference synchronization signal; and a control unit to control the communication unit.

The control unit may control the communication unit to send a reference synchronization signal at one of preset points in time a synchronization frame designed to preserve temporal orthogonality between classes, control, when an asynchronization indication indicating a mismatch between the reference synchronization signal and a reference synchronization signal sent by a second device is received via the communication unit from a third device, the communication unit to send an asynchronization confirmation to the third device, and perform synchronization together with the third device in a network-distributed manner.

BRIEF DESCRIPTION OF THE DRAWINGS

FIGS. 4A to 4C illustrate situations where synchronization signals are sent so as to achieve synchronization between reference synch devices of different classes while preserving orthogonality therebetween according to the present invention.

FIGS. 8A to 8F illustrate situations where synchronization signals are sent so as to achieve synchronization between D2D networks according to an embodiment of the present invention.

DETAILED DESCRIPTION

Figure 1A:
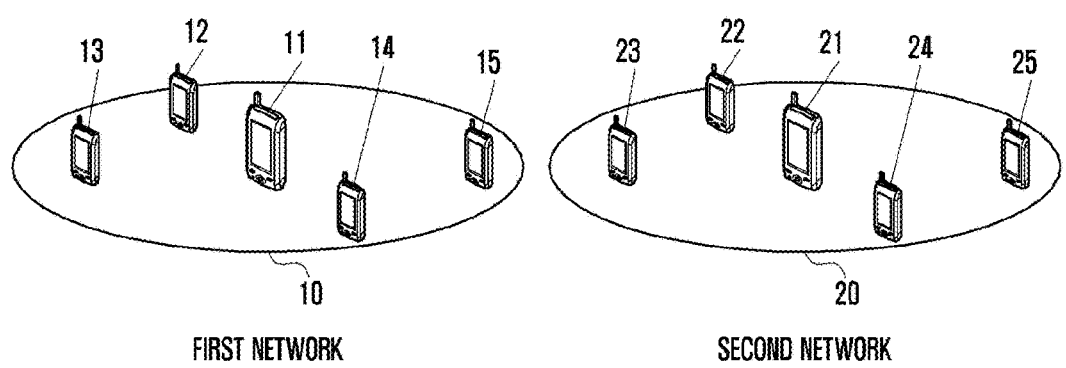
FIGS. 1A and 1B illustrate selection of representative electronic devices for communication among electronic devices capable of wireless communication.

Hereinafter, various embodiments of the present invention are described in detail with reference to the accompanying drawings. The same or similar reference symbols are used throughout the drawings to refer to the same or like parts. In the drawings, some elements are exaggerated, omitted, or only outlined in brief, and thus may be not drawn to scale. The present invention is not limited by relative sizes or arrangements of objects. Detailed descriptions of well-known functions and structures incorporated herein may be omitted to avoid obscuring the subject matter of the present invention. The following description includes various specific details to assist understanding of embodiments of the present invention but these are to be regarded as merely exemplary.

First, a description is given of basic concepts used in the present invention. Achieving synchronization between electronic devices (terminals, devices, or user equipments) capable of wireless communication indicates that the electronic devices synchronize their timing references without help from instruments providing the reference time such as the GPS and synchronous base station. Each electronic device has an oscillator to set its timing reference. To efficiently exchange control and data signals through a D2D communication link without collisions, the electronic devices should have the same timing reference and the same frame structure.

Initially, as electronic devices activate their oscillators at different points in time, they have different timing references. For example, assuming that oscillator values repeat from 0 to 100, if device A starts its oscillator at absolute time 10 and device B starts its oscillator at absolute time 40, device A has an oscillator value of 40 and device B has an oscillator value of 10 at absolute time 50.

Hence, an existing scheme for achieving synchronization between electronic devices on a network makes an attempt to let the electronic devices know and resolve oscillator value differences. In the above example, device A notifies an oscillator value of 40 to device B at absolute time 50, and device B notifies a difference of 30 (40−10) back to device A. Then, device A may change its oscillator value, achieving synchronization between device A and device B.

However, as the number of devices increases, it becomes difficult to make the network converge within a desired time through repeated application of such one-to-one operation only. As such, various other schemes have been proposed that involve following the timing reference of an electronic device elected as a representative or repeating application of one-to-many operation.

The present invention proposes a synchronization scheme that elects a representative device and achieves synchronization in the overall network through one-to-one or one-to-many synchronization operation between representative devices if necessary. In the following description, the signal or frame used to achieve synchronization between electronic devices may be denoted by different terms or words according to systems, standards, organizations or companies. That is, the signal or frame used to achieve synchronization between electronic devices may be denoted by multiple terms including reference signal, reference frame, synchronization signal, synchronization frame, time synchronization, synchronization time, time reference, synchronization time information, reference synchronization signal, and reference synchronization frame. However, the present invention is not limited by usage of such terminologies as long as they indicate the same behavior or operation as described in the description.

Next, a case where one representative device is elected is described with reference to the drawings.

Figure 1B:
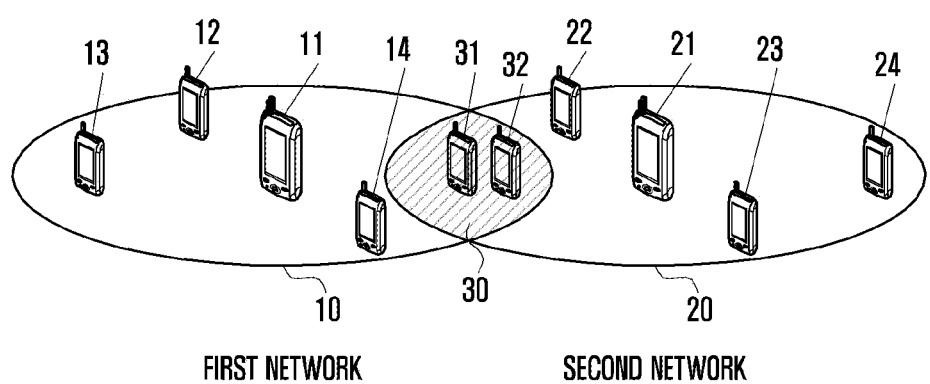

FIGS. 1A and 1B illustrate selection of representative devices for communication among electronic devices capable of wireless communication.

In FIG. 1A, representative devices are selected when there is no overlapped area between networks. In FIG. 1B, representative devices are selected when there exists an overlapped area between networks.

Referring to FIG. 1A, individual devices 11, 12, 13, 14 and 15 on a first network 10 constitute a synchronized network on the basis of synchronization signals sent by the device 11 serving as a first reference synch device, and individual devices 21, 22, 23, 24 and 25 on a second network 20 constitute a synchronized network on the basis of synchronization signals sent by the device 21 serving as a second reference synch device.

Here, the devices 11, 12, 13, 14 and 15 on the first network 10 and the devices 21, 22, 23, 24 and 25 on the second network 20 are all electronic devices capable of D2D wireless communication. When there is no overlapped area between the first network 10 and the second network 20 as shown in FIG. 1A, interference does not occur between devices belonging to different networks, not causing trouble to data exchange. In this case, no problem may occur owing to the lack of synchronization between the first reference synch device 11 on the first network 10 and the second reference synch device 21 on the second network 20.

In FIG. 1B, there exists an overlapped area between networks. Referring to FIG. 1B, among devices 11, 12, 13, 14, 31 and 32 on a first network 10, the devices 12, 13 and 14 outside the overlapped area 30 constitute a synchronized network on the basis of synchronization signals sent by the device 11 serving as a first reference synch device. Among devices 21, 22, 23, 24, 31 and 32 on a second network 20, the devices 21, 22, 23 and 24 outside the overlapped area 30 constitute a synchronized network on the basis of synchronization signals sent by the device 21 serving as a second reference synch device.

As shown in FIG. 1B, the devices 31 and 32 remaining in the overlapped area 30 between the first and second networks 10 and 20 may receive reference synchronization signals from the first and second networks 10 and 20. Here, the devices 11, 12, 13, 14, 21, 22, 23, 24, 31 and 32 on the first and second networks 10 and 20 are all electronic devices capable of D2D wireless communication.

In this case, when the first reference synch device 11 on the first network 10 is not synchronized with the second reference synch device 21 on the second network 20, the devices 31 and 32 remaining in the overlapped area 30 may be unable to perform wireless communication. In addition, when a device in the overlapped area 30 sends data, the sending device may cause severe interference to other proximate devices or may be unable to perform resource control for communication with receiving devices.

For example, assume that a first device 31 in the overlapped area 30 attempts to communicate in synchronization with the first reference synch device 11 in a situation where the first network 10 is not synchronized with the second network 20. Then, a signal sent by the first device 31 may reach at least one of the devices 21, 22, 23 and 24 on the second network 20 outside the overlapped area 30. That is, the signal sent by the first device 31 in the overlapped area 30 may cause interference to at least one of the devices 21, 22, 23 and 24 on the second network 20 outside the overlapped area 30. Such interference may reduce data transmission efficiency or block communication of at least one of the devices on the second network 20 outside the overlapped area 30 being capable of receiving a signal from the first device 31 in the overlapped area 30.

As another example, if the first device 31 in the overlapped area 30 follows the reference time of the first network 10 and the second device 31 in the overlapped area 30 follows the reference time of the second network 20, when the first device 31 and the second device 31 perform data transmission and reception at similar points in time, severe communication failure may occur.

For another example, assume that the first device 31 in the overlapped area 30 follows the reference time of the first network 10 and the second device 31 in the overlapped area 30 follows the reference time of the second network 20. Here, when the first device 31 broadcasts a signal, the second device 31, although in the vicinity of the first device 31, may be unaware of the exact reception timing owing to a mismatch in synchronization and communication failure may be caused.

The situations depicted in FIGS. 1A and 1B are related to a problem that may occur when the D2D network is formed based on a centralized synchronization scheme. A situation similar to that of FIG. 1B may also arise when multiple devices constitute a network through one-to-many synchronization operation or when two or more networks not in synchronization overlap with each other as a result of expanding networks with different reference times. In such a situation, a distributed synchronization scheme may achieve synchronization in stages although consuming a relatively large amount of time and resources. However, the centralized synchronization scheme may fail to achieve synchronization.

FIGS. 2A to 2D illustrate synchronization when two different networks overlap with each other according to an embodiment of the present invention.

Figure 2A:
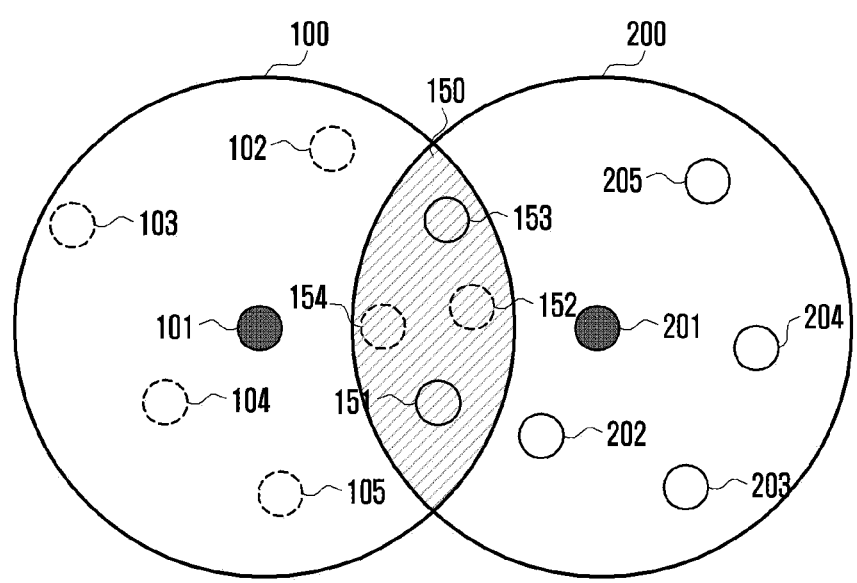
FIGS. 2A to 2D illustrate synchronization when two different networks overlap with each other according to an embodiment of the present invention.

Referring to FIG. 2A, multiple devices 101, 102, 103, 104, 105, 151, 152, 153 and 154 belong to a first network 100, and multiple devices 151, 152, 153, 154, 201, 202, 203, 204 and 205 belong to a second network 200. There is an overlapped area 150 between the first network 100 and the second network 200 as in the case of FIG. 1B. As described above, the devices 151, 152, 153 and 154 remaining in the overlapped area 150 may have two problems.

More specifically, one is a problem within a network and the other is a problem between networks. As shown in 2A, different reference synch devices 101 and 201 providing a reference synchronization signal are present respectively in the individual networks 100 and 200. One or more regular electronic devices not providing a reference synchronization signal are present in each network 100 or 200. To send and receive data, a regular device should receive a reference synchronization signal and achieve synchronization with the corresponding reference synch device. As described before, each of the devices 151, 152, 153 and 154 remaining in the overlapped area 150, receiving different reference synchronization signals from the different reference synch devices 101 and 201, has to select one reference synch device according to a preset selection criterion. For example, selection of one reference synch device may be made on the basis of the received signal power from the reference synch devices 101 and 201 or other criteria.

However, when devices are moved or channel states are changed, a regular device may have to frequently change the reference synch device. For example, when channel states are changed owing to movement of the device, occurrence of an obstacle, or other causes, the received signal strength may change accordingly. In this case, the device using the received signal strength as the selection criterion may have to change the reference synch device. In addition, when multiple synchronization signals are received in an overlapping manner, the devices 151, 152, 153 and 154 in the overlapped area 150 may undergo degradation of synchronization signal detection performance.

Figure 2B:
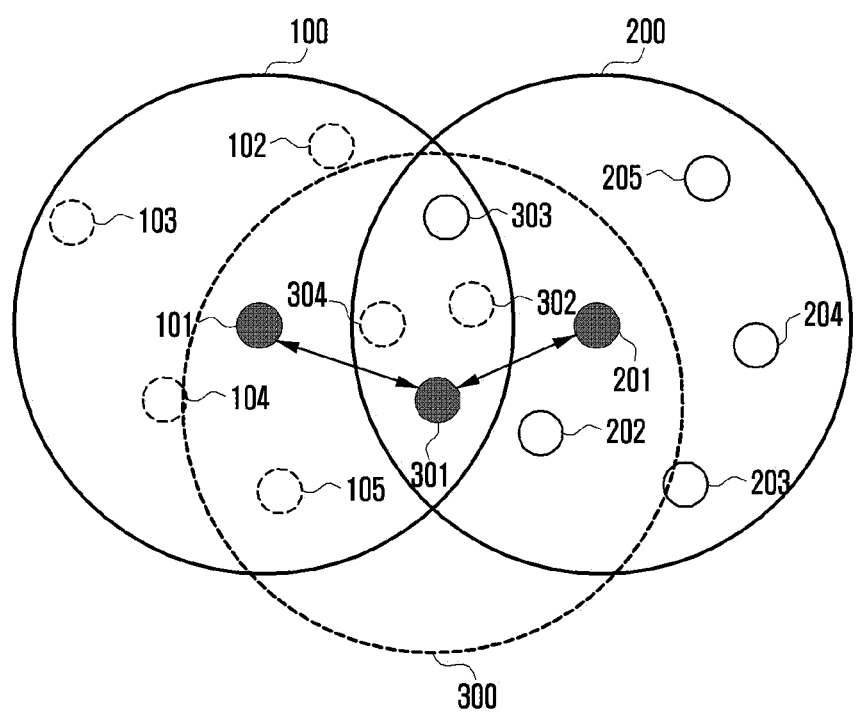

In the present invention, to solve the above problem, a new network is formed in the overlapped area first as shown in FIG. 2B. That is, one of the devices in the overlapped area 150 of FIG. 2A is configured as a reference synch device and a third network is formed as shown in FIG. 2B.

FIG. 2B shows that the device 151 among the devices 151, 152, 153 and 154 in the overlapped area 150 is configured as a third reference synch device 301 for the third network 300. As the third reference synch device 301 of the third network 300 is one of the devices placed in the overlapped area 150 between the first network 100 and the second network 200, it may send a signal not only to the first reference synch device 101 of the first network 100 but also to the second reference synch device 201 of the second network 200.

Configuring networks as shown in FIG. 2B does not solve all problems. A description is given of a problem arising in the network configuration of FIG. 2B with reference to FIG. 2C.

Figure 2C:
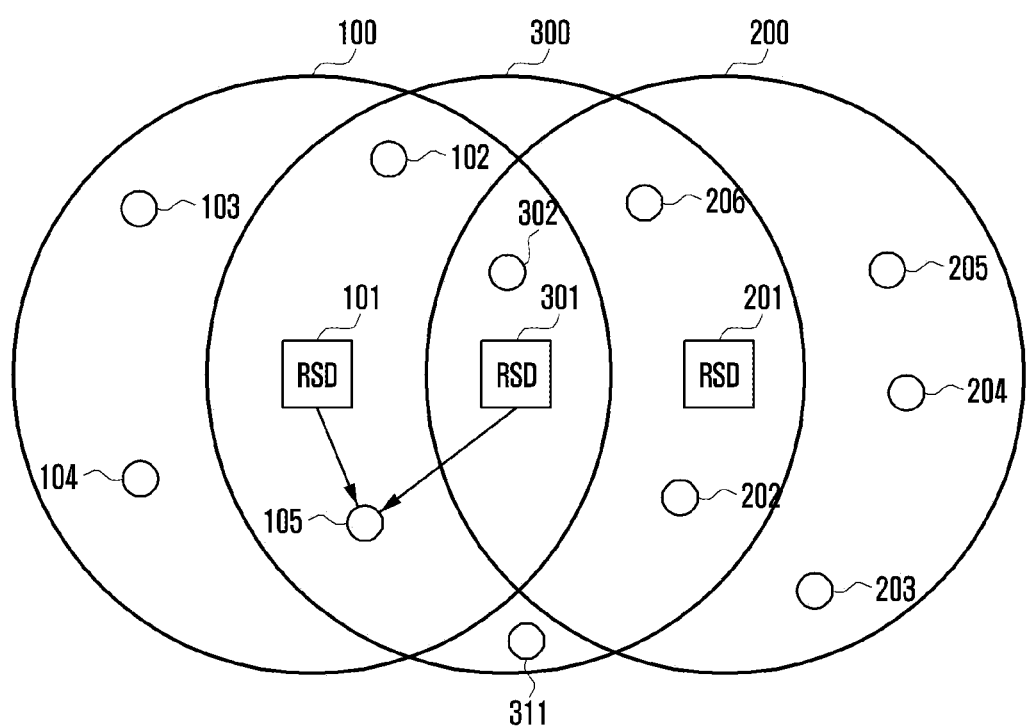

FIG. 2C depicts a synchronization problem arising when the third network 300 is formed. In FIG. 2C, two devices 103 and 104 receive a signal only from the first reference synch device 101 of the first network 100, three devices 102, 105 and 302 of the first network 100 receive reference synchronization signals from the first reference synch device 101 and the third reference synch device 301 of the third network 300.

Consider one of the devices 102, 105 and 302 belonging to the first network 100 and the third network 300 after the third reference synch device 301 is configured to provide a synchronization signal for the third network 300. The device 105 receives a reference synchronization signal from the first reference synch device 101 and also receives a reference synchronization signal from the third reference synch device 301. To receive a reference synchronization signal from the different reference synch devices 101 and 301, synchronization is to be achieved between the individual reference synch devices 101, 201 and 301. Hence, synchronization is to be achieved between the reference synch devices 101 and 301. Next, a description is given of a scheme to achieve synchronization between individual reference synch devices 101, 201 and 301 with reference to FIG. 2D.

Figure 2D:
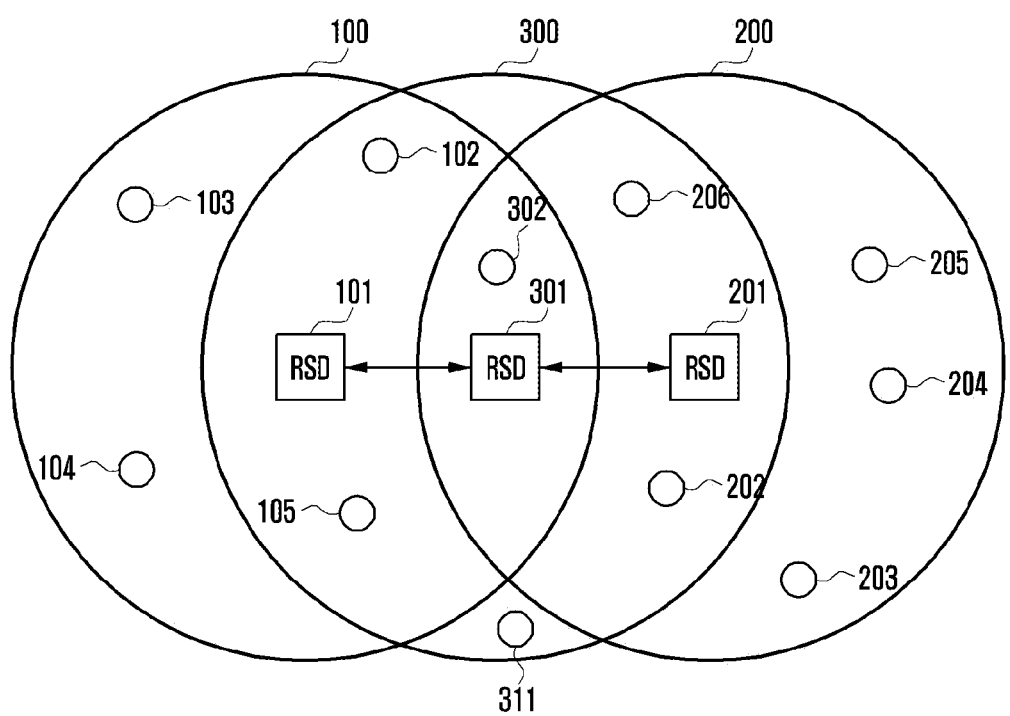

FIG. 2D illustrates a concept for achieving synchronization between different reference synch devices according to the present invention.

As shown in FIG. 2D, the third reference synch device 301 of the third network 300 may communicate not only with the first reference synch device 101 of the first network 100 but also with the second reference synch device 201 of the second network 200. Hence, achievement of synchronization between the three different reference synch devices 101, 201 and 301 may lead to achievement of synchronization between the first to third networks 100, 200 and 300.

However, use of currently known schemes may cause the following problem. To achieve synchronization, the individual reference synch devices 101, 201 and 301 perform transmission at the same perceived time. Then, the reference synch devices 101, 201 and 301 may fail to achieve complete synchronization owing to the half-duplex problem.

Figure 3A:
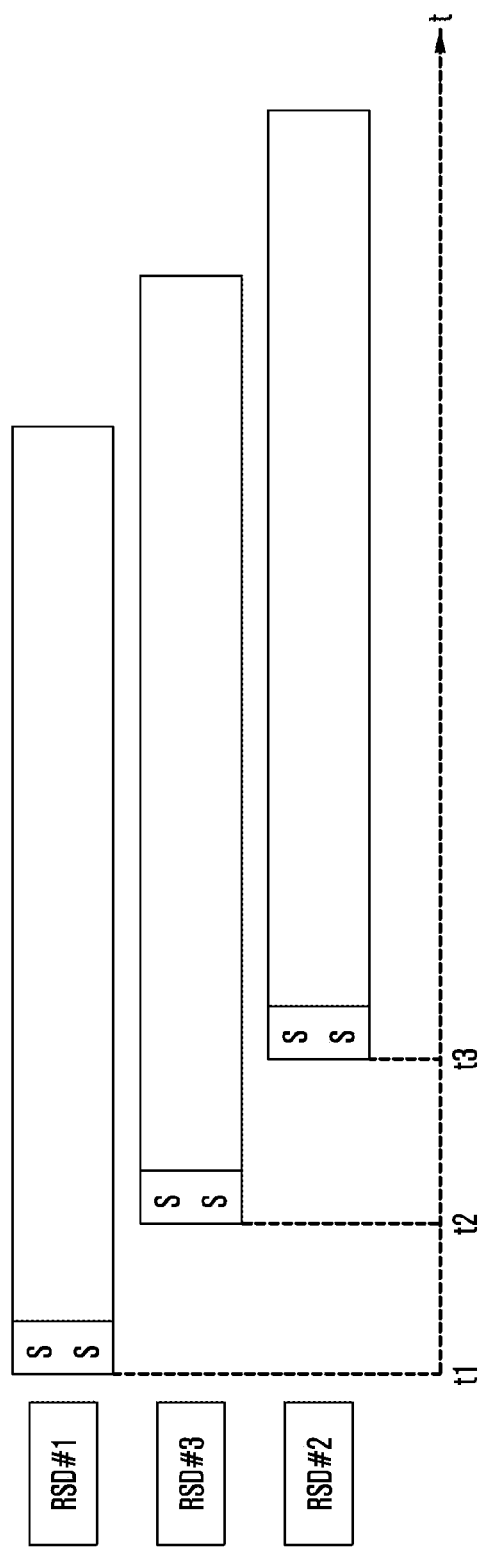
FIGS. 3A and 3B are timing diagrams illustrating a half-duplex problem arising when an attempt is made to achieve synchronization between reference synch devices.
Figure 3B:
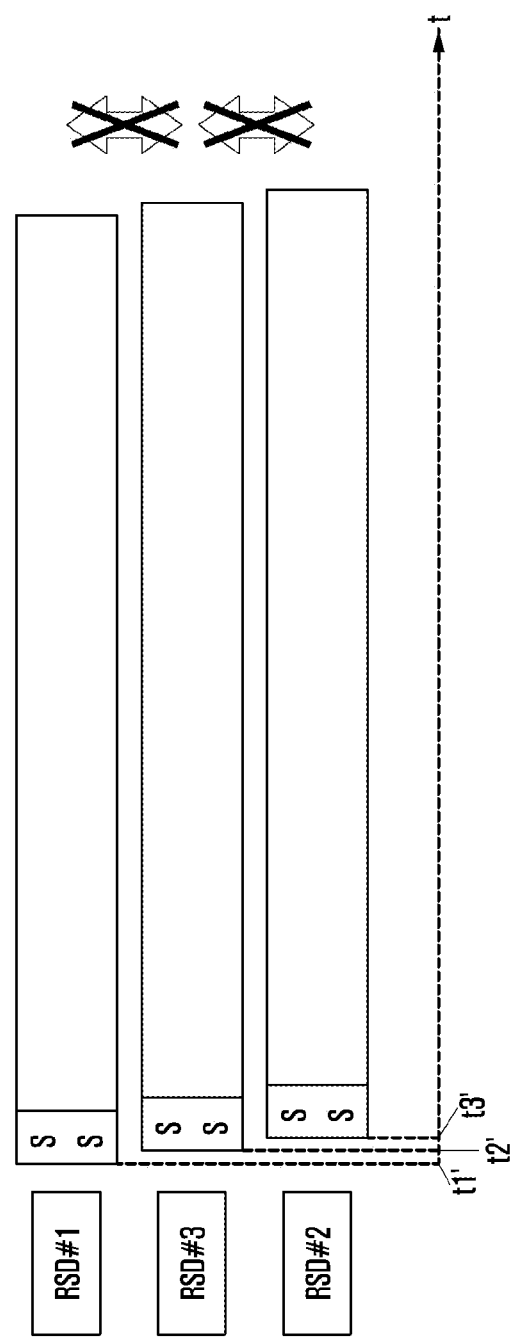

FIGS. 3A and 3B are timing diagrams illustrating a half-duplex problem arising when an attempt is made to achieve synchronization between reference synch devices.

Referring to FIG. 3A, reference synch device #1 (RSD #1) sends a synchronization signal (SS) at time t1, reference synch device #2 (RSD #2) sends a synchronization signal at time t3, and reference synch device #3 (RSD #3) sends a synchronization signal at time t2.

When the three reference synch devices send synchronization signals at different points in time, it is possible to make a synchronization attempt using a distributed scheme or the like as they can communicate with each other. However, such a synchronization attempt using a distributed scheme may fail to achieve precise synchronization as depicted in FIG. 3B.

FIG. 3B is a timing diagram illustrating a synchronization mismatch due to half duplexing when an attempt is made to achieve synchronization between reference synch devices. In FIG. 3B, the transmission time of a synchronization signal (SS) for reference synch device #1 (RSD #1) is shifted from time t1 to time t1', the transmission time of a synchronization signal for reference synch device #3 (RSD #3) is shifted from time t2 to time t2', and the transmission time of a synchronization signal for reference synch device #2 (RSD #2) is shifted from time t3 to time t3'.

As shown in FIG. 3B, it may be impossible to achieve precise synchronization between some of electronic devices performing D2D or ad-hoc communication by use of currently known schemes. This is because one reference synch device may fail to receive a synchronization signal from another reference synch device while sending a synchronization signal in certain situations.

Accordingly, in the present invention, synchronization is carried out by use of classes of reference synch devices. In addition, to resolve the half-duplex problem, reference synch devices of different classes may be configured to send synchronization signals at different points in time.

Figure 4A:
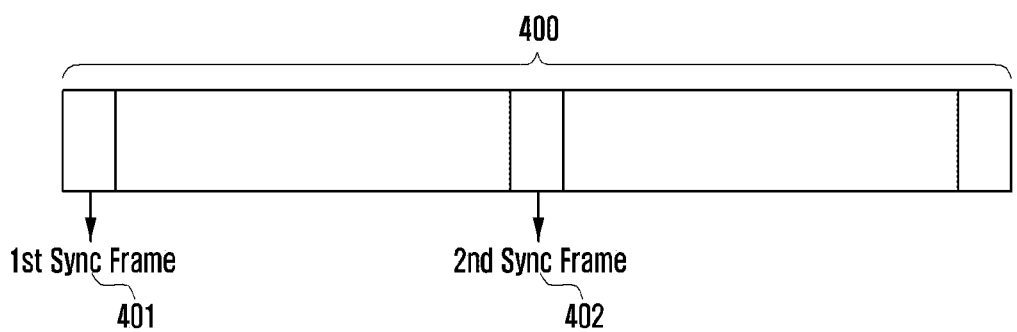
Figure 4C:
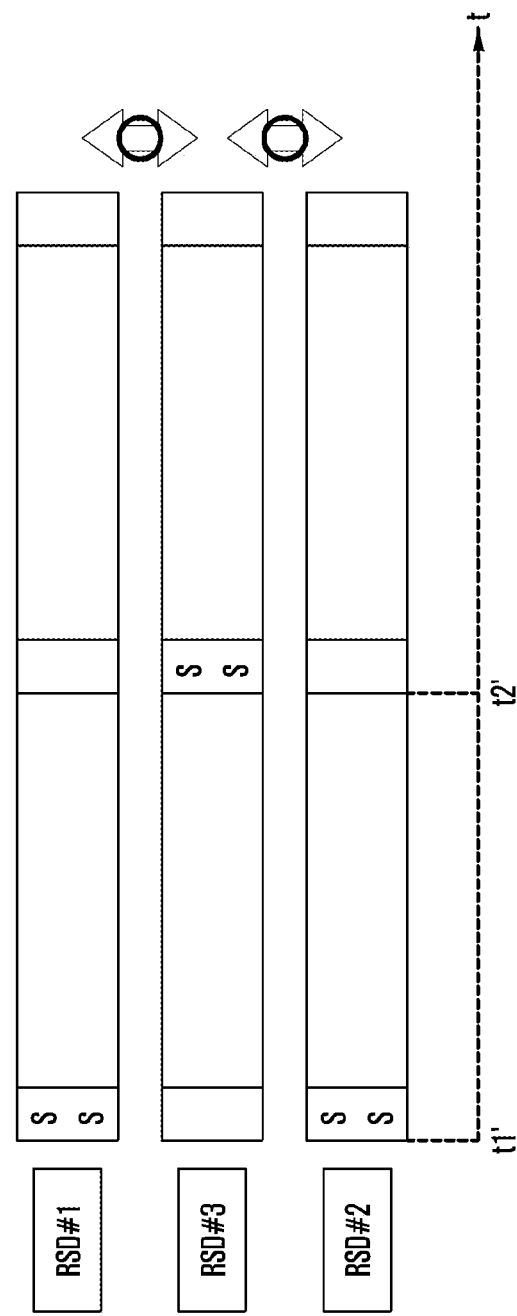

FIGS. 4A to 4C illustrate situations where synchronization signals are sent so as to achieve synchronization between reference synch devices of different classes while preserving orthogonality therebetween according to the present invention.

Referring to FIG. 4A, the frame sent according to the present invention may include two orthogonal synchronization frames. It is assumed that indicia 400 of FIG. 4A indicates one packet or a full frame. For ease of description, it is assumed that FIG. 4A indicates one packet 400.

The packet 400 may include a first sync frame 401 and a second sync frame 402. The two sync frames preserving orthogonality as shown in FIG. 4A are used when electronic devices are classified into two classes. When three or more classes are utilized, the packet 400 may be configured to have three or more sync frames. In the present invention, the packet 400 may be extended to have multiple sync frames for one class. In this case, to distinguish individual sync frames for the same class, additional information indicating different points in time is to be included in a synchronization signal or synchronization channel. For example, when three sync frames are configured for the second class, the sequence of the synchronization signal may be used to indicate the class and the subsequent synchronization channel may be used to indicate the sequence number of the intended sync frame among the sync frames of the second class.

When a packet shown in FIG. 4A is used for network configurations shown in FIGS. 2C and 2D, initial transmissions may be represented as shown in FIG. 4B.

For network configurations shown in FIGS. 2C and 2D, the first reference synch device 101 and the second reference synch device 201 may have a high priority. This is because the first reference synch device 101 and the second reference synch device 201 do not receive a reference synchronization signal from other proximate devices at the time when they are initially selected as a reference synch device. A device initially configured as a reference synch device, like the first reference synch device 101 or the second reference synch device 201, is referred to as a first class device. A device configured as a reference synch device after receiving reference synchronization signals from two or more different reference synch devices, like the third reference synch device 301, is referred to as a second class device.

To send a packet 400, the first or second reference synch device 101 or 201 of the first class inserts its synchronization signal in the first sync frame field 401, and the third reference synch device 301 of the second class inserts its synchronization signal in the second sync frame field 402.

Referring to FIG. 4B, the first reference synch device 101 of the first class inserts its synchronization signal in the first sync frame field 401 of a packet 410 and sends the packet 410 at time t1; and the second reference synch device 201 of the first class inserts its synchronization signal in the first sync frame field 431 of a packet 430 and sends the packet 430 at time t3. Here, the first reference synch device 101 does not insert a synchronization signal in the second sync frame field 412 of the packet 410, and the second reference synch device 201 does not insert a synchronization signal in the second sync frame field 432 of the packet 430.

To send a packet 420, the third reference synch device 301 of the second class inserts a synchronization signal in the second sync frame field 422 and does not insert a synchronization signal in the first sync frame field 421.

As shown, the first reference synch device 101 sends a frame structure 410 containing a synchronization signal inserted at time t1; the second reference synch device 201 sends a frame structure 430 containing a synchronization signal inserted at time t3; and the third reference synch device 301 sends a frame structure 420 containing a synchronization signal inserted at time t5.

Hence, the individual reference synch devices 101, 201 and 301 may identify the amount of mismatch in synchronization therebetween, and may achieve synchronization therebetween after identifying the amount of synchronization mismatch. This inter-device synchronization may be repeated for networks in a distributed manner. Here, when a device can obtain absolute time information like GPS information and the absolute time information can be provided to other reference synch devices, the synchronization process may be carried out in accordance with the device having absolute time information. In particular, it is preferable for an electronic device having absolute time information to operate as a reference synch device of the first class.

Synchronization between devices having different synchronization times may resolve the half duplex problem described above, achieving precise synchronization as shown in FIG. 4C. That is, all the reference synch devices 101, 201 and 301 may be synchronized at time t1'; and the first reference synch device 101 and the second reference synch device 201 may send a synchronization signal at time t1', and the third reference synch device 301 may send a synchronization signal at time t2'.

Hereinabove, a description is given of creating a third network when two networks overlap with each other. In such a case, electronic devices are classified into two classes. Next, a description is given of a case where electronic devices are classified into three classes as the number of networks involved increases.

Figure 5A:
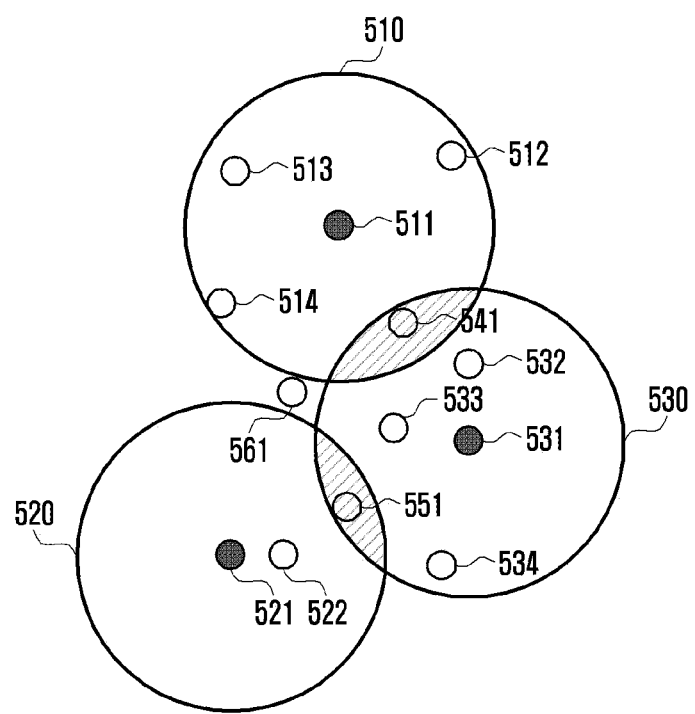
FIGS. 5A to 5C illustrate achievement of synchronization between all electronic devices by creating more networks in overlapped areas between initial three networks according to the present invention.
Figure 5B:
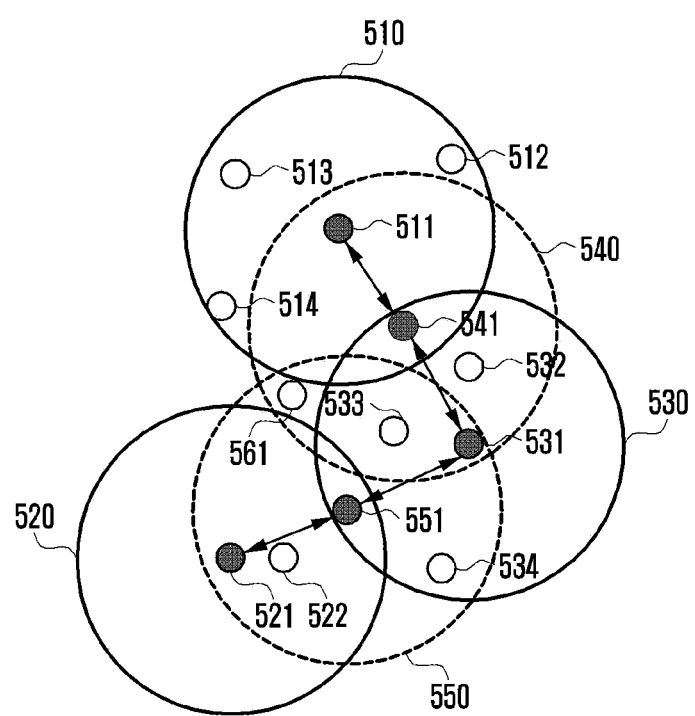
Figure 5C:
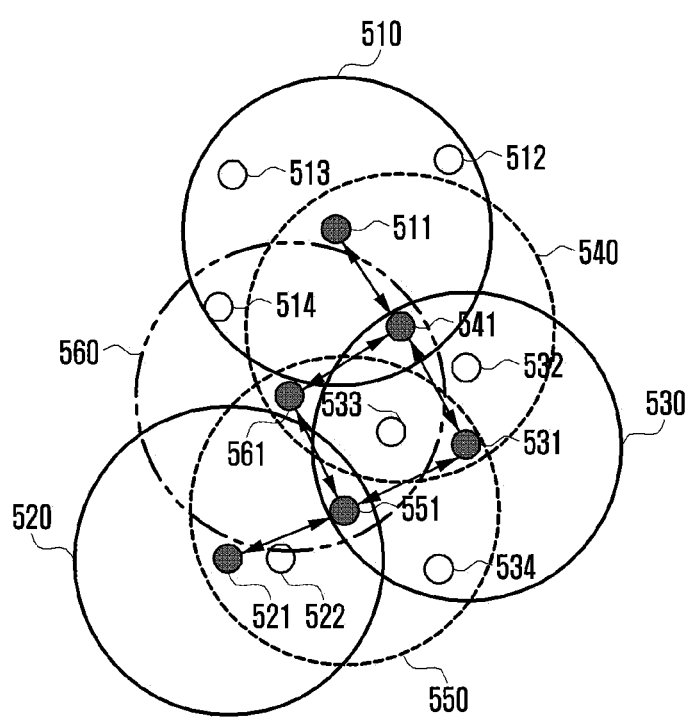

FIGS. 5A to 5C illustrate achievement of synchronization between all electronic devices by creating more networks in overlapped areas between initial three networks according to the present invention.

In FIG. 5A, a first reference synch device 511 constitutes a first network 510; a second reference synch device 521 constitutes a second network 520; and a third reference synch device 531 constitutes a third network 530. As the reference synch devices 511, 521 and 531 do not receive a signal from other proximate devices, they may become a device of the top class (e.g. first class).

For the first network 510 containing the first reference synch device 511, devices 512, 513 and 514 belong only to the first network 510, and a device 541 belongs to an overlapped area between the first network 510 and the third network 530. For the second network 520 containing the second reference synch device 521, a device 522 belongs only to the second network 520, and a device 551 belongs to an overlapped area between the second network 520 and the third network 530. For the third network 530 containing the third reference synch device 531, device 532, 533 and 534 belong only to the third network 530, a device 541 belongs to an overlapped area between the first network 510 and the third network 530, and a device 551 belongs to an overlapped area between the second network 520 and the third network 530.

In this configuration, the device 541 belonging to the overlapped area between the first network 510 and the third network 530 receives a reference synchronization signal from the first reference synch device 511 of the first network 510 and receives a reference synchronization signal from the third reference synch device 531 of the third network 530. Hence, the device 541 may become a reference synch device of the second class. Here, when two or more devices remaining in the overlapped area between the first network 510 and the third network 530 receive a reference synchronization signal from the first reference synch device 511 of the first network 510 and receive a reference synchronization signal from the third reference synch device 531 of the third network 530, one of the two or more devices may become a reference synch device of the second class. This is described in more detail later with reference to the drawings.

The device 551 belonging to the overlapped area between the second network 520 and the third network 530 receives a reference synchronization signal from the second reference synch device 521 of the second network 520 and receives a reference synchronization signal from the third reference synch device 531 of the third network 530. Hence, the device 551 may become a reference synch device of the second class. Here, when two or more devices remaining in the overlapped area between the second network 520 and the third network 530 receive a reference synchronization signal from the second reference synch device 521 of the second network 520 and receive a reference synchronization signal from the third reference synch device 531 of the third network 530, one of the two or more devices may become a reference synch device of the second class.

The devices 541 and 551, which receive reference synchronization signals from two or more devices as shown in FIG. 5A, may become reference synch devices of the second class and constitute a fourth network 540 and a fifth network 550, respectively.

FIG. 5B illustrates a case where electronic devices receiving reference synchronization signals from two or more devices are configured respectively as reference synch devices of the second class.

As shown in FIG. 5B, the devices 541 and 551 of the second class constitute the fourth network 540 and the fifth network 550, and send second class reference synchronization signals to the fourth network 540 and the fifth network 550, respectively. The second class reference synchronization signal may have a format as shown in FIG. 4A, or may have a different format for three or more classes. A different packet format for specifying three or more classes is described in more detail later with reference to the drawings.

In FIG. 5B, unlike the case of FIG. 5A, a device 561 does not belong to any of the first network 510, second network 520 and third network 530 before creation of the fourth network 540 and the fifth network 550, and may become placed in an overlapped area between the fourth network 540 and the fifth network 550 after creation thereof. The device 561, which is placed in an overlapped area after creation of the fourth network 540 and the fifth network 550, may become a device sending a reference synchronization signal autonomously or through competition with another device as described before.

FIG. 5C illustrates a case where an electronic device receiving reference synchronization signals from two or more devices of the second class is configured as a reference synch device of the third class.

As shown in FIG. 5C, the device 561 constituting a sixth network 560 may become a device of the third class. Here, when two or more devices remaining in the overlapped area between the fourth network 540 and the fifth network 550 receive a reference synchronization signal from the fourth reference synch device 541 of the fourth network 540 and receive a reference synchronization signal from the fifth reference synch device 551 of the fifth network 550, one of the two or more devices may become a reference synch device of the third class. If there are only two classes in networks, the device 561 constituting the sixth network 560 may become a device sending a second class reference synchronization signal.

Figure 6:
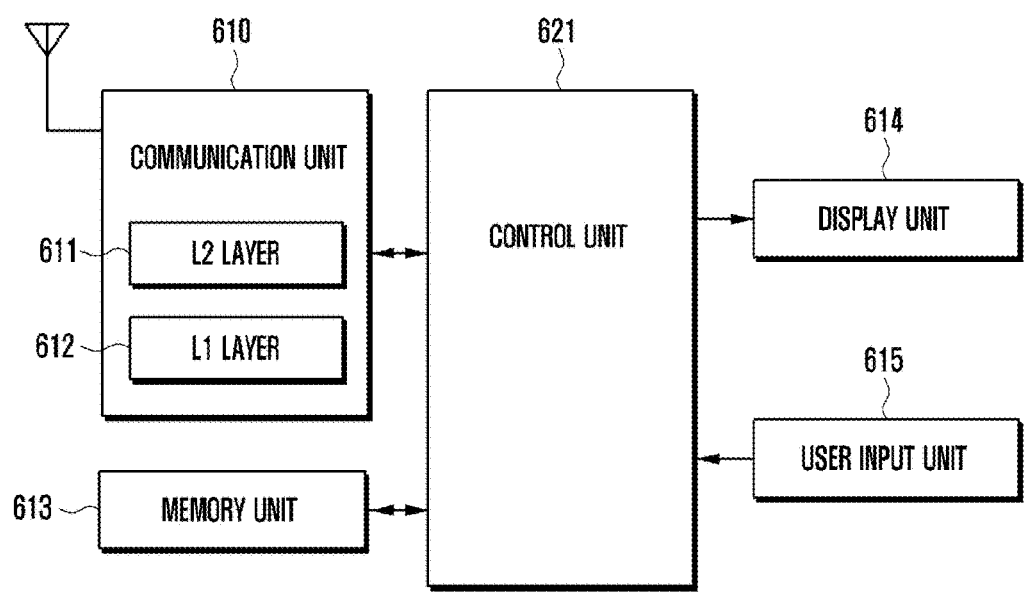
FIG. 6 is a block diagram of an electronic device according to an embodiment of the present invention.

FIG. 6 is a block diagram of an electronic device according to an embodiment of the present invention.

Referring to FIG. 6, the electronic device includes a communication unit 610 for wireless communication. The communication unit 610 may send and receive signals using a preset band via an antenna. The communication unit 610 may include a radio frequency (RF) processor (not shown) to upconvert a signal to be sent and to downconvert a received signal, an L1 layer 612 to handle a signal, data or sequence to be sent, and an L2 layer 611 to process data according to preset formats. The communication unit 610 may include a codec or modem to code and decode signals for transmission and reception. In particular, the communication unit 610 may send and receive data or signals according to D2D mode of the present invention.

The memory unit 613 may temporarily store control data for the operation of the electronic device and data generated during control. The memory unit 613 may also store algorithms or control data for D2D communication according to the present invention. The memory unit 613 may include one or more regions to store user data according to user requests.

The control unit 621 controls overall operations of the electronic device, and may perform control operations needed for D2D communication according to the present invention. In particular, the control unit 621 may perform control operations for D2D communication so as to enable the electronic device to operate as a regular device, operate as a reference synch device, and achieve synchronization with another reference synch device.

The display unit 614 may be realized using LCD, LED or OLED. Under the control of the control unit 621, the display unit 614 may provide the user with information on the operation and status of the electronic device in various forms including texts, symbols, emoticons and graphics. The display unit 614 may be omitted according to the configuration of the electronic device.

The user input unit 615 is an interface used by the user to input desired data to the electronic device, and may include a key, a touchscreen, and a proximity sensor. The user input unit 615 detects an input signal from the user and forwards the input signal to the control unit 621. The user input unit 615 may be omitted according to the configuration of the electronic device.

According to embodiments, the electronic device may further include components not shown in FIG. 6. For example, the electronic device may further include a component to receive position signals from satellites, various sensors to detect user input, a component to communicate with a mobile communication network, and voice processing components such as a microphone, speaker and vocoder. On the other hand, the display unit 614 and the user input unit 615 may be omitted as described above.

Figure 7:
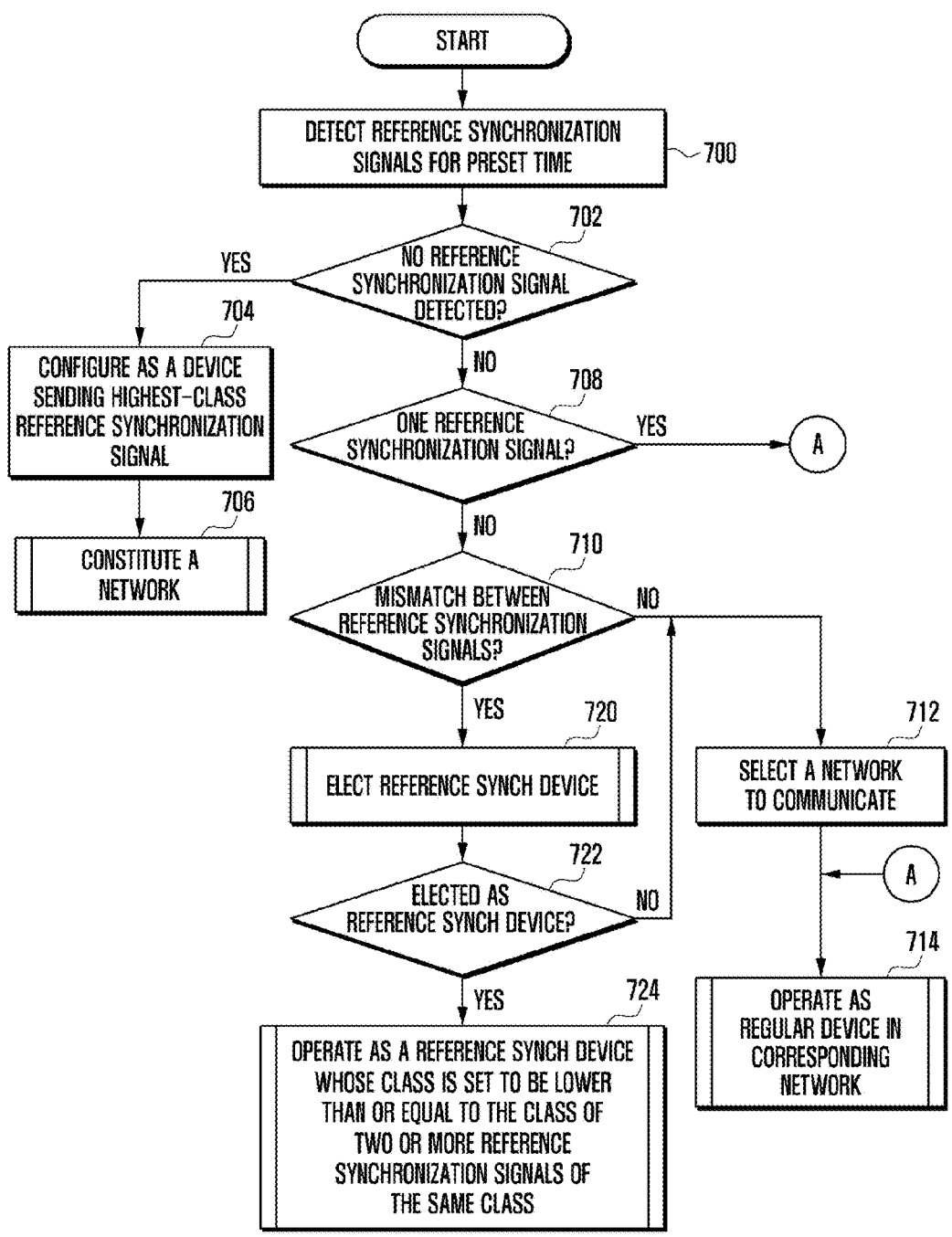
FIG. 7 is a flowchart for forming a D2D network by an electronic device according to the present invention.

FIG. 7 is a flowchart for forming a D2D network by an electronic device according to the present invention.

FIG. 7 illustrates flow of control when the electronic device enters a D2D network or initiates D2D communication. At step 700, the control unit 621 of the electronic device controls the communication unit 610 to scan the D2D communication band for a reference synchronization signal for a preset duration. Here, to detect a reference synchronization signal, the preset duration should be longer than or equal to the period set for reference synchronization signal transmission.

At step 702, the control unit 621 checks whether a reference synchronization signal is detected during the Preset duration. The checking result at step 702 may be used to examine satisfaction of a condition to become a first reference synch device. If no reference synchronization signal is received during the preset duration, the procedure proceeds to step 704. If at least one reference synchronization signal is received, the procedure proceeds to step 708.

At step 704, the control unit 621 configures the electronic device as a device sending a top class reference synchronization signal. As described before, when there are either two classes (first and second) or three classes (first, second and third), the electronic device is configured as a device sending a first class reference synchronization signal at step 704. In the following description, it is assumed that there are three classes. However, it will be apparent to those skilled in the art that the present invention can be carried out in an identical way when there are two classes or four or more classes.

After configuring the electronic device as a top class device, the control unit 621 may store corresponding class information in the memory unit 613. At step 706, the control unit 621 constitutes a network as a top class device, and sends a reference synchronization signal of the top class. The electronic device configured at steps 704 and 706 may correspond to a device constituting one network shown in FIG. 5A (for example, the first reference synch device 511, the second reference synch device 521, or the third reference synch device 531).

When the network is formed at step 706, the corresponding device of the first class may send a reference synchronization signal at a random point in time as described in connection with FIGS. 5A to 5C. Later, when a proximate device sending a different reference synchronization signal makes an appearance, the device of the first class may change the point in time for reference synchronization signal transmission as described in connection with FIGS. 5A to 5C. Here, the class of the device may be not changed.

At step 708, the control unit 621 checks the number of reference synchronization signals detected during the preset duration. If only one reference synchronization signal is detected, the procedure proceeds to step 714. If two or more reference synchronization signals are detected, the procedure proceeds to step 710.

At step 714 (detection of only one reference synchronization signal), the control unit 621 configures the electronic device as a regular device operating in synchronization with a different device having sent the detected reference synchronization signal. As a regular device, the electronic device may perform communication within the corresponding network.

In one embodiment, a regular device belonging to a specific network may perform communication within the network in synchronization with a different device sending a reference synchronization signal. This indicates that D2D communication is carried out in a centralized manner within a specific network. An electronic device operating as a regular device within the corresponding network may undergo a change in reference synchronization signal transmission. For example, as described before in connection with FIGS. 5A to 5C, when a proximate device sending a different reference synchronization signal makes an appearance, the device sending the reference synchronization signal may change the point in time for reference synchronization signal transmission. When the reference synchronization signal changes, the electronic device operating as a regular device may perform resynchronization according to a synchronization signal or reference time change signal provided by the device sending the reference synchronization signal. For example, as described before in connection with FIGS. 4B and 4C, regular device may be resynchronized with the help of a reference synch device in a manner of inter-network distribution. That is, when a synchronization signal is represented as a sequence, reception of a single reference synchronization signal may mean reception of a signal indicating one reference time. When a synchronization signal is represented as a message, reception of a single reference synchronization signal may mean reception of one or more messages indicating one reference time. In addition, the reference time may be unchanged when it is received from a synchronization device already being synchronized, or may be changed when it is received from a new synchronization device.

At step 710 (detection of two or more reference synchronization signals), the control unit 621 checks whether there is a mismatch between the detected reference synchronization signals. This may correspond to examining whether the timing is related to the case of FIG. 4B or to the case of FIG. 4C. If there is a mismatch between the detected reference synchronization signals, the procedure proceeds to step 720. If there is no mismatch between the detected reference synchronization signals, the procedure proceeds to step 712. Here, the detected reference synchronization signals may include a synchronization signal sent by the reference synch device with which the electronic device has been originally synchronized. Hence, detection of two or more out-of-sync synchronization signals may include a case where the electronic device has detected a synchronization signal sent by a reference synch device not originally synchronized with the electronic device (preferring the timing of a synchronization signal from the reference synch device with which the electronic device has been originally synchronized), and a case where the electronic device has detected two or more synchronization signals having a timing different from that of the reference synch device originally synchronized with the electronic device while the originally synchronized reference synch device intentionally discontinues synchronization signal transmission during the scanning duration.

At step 712 (no mismatch between detected reference synchronization signals), the control unit 621 selects a network to communicate. There may be various selection criteria. In one embodiment, the control unit 621 may identify one of the detected reference synchronization signals having the highest strength and select the network associated with a device having sent the highest-strength reference synchronization signal for D2D communication. In another embodiment, the control unit 621 may identify one of the detected reference synchronization signals having the highest class and select the network associated with a device having sent the highest-class reference synchronization signal for D2D communication. In another embodiment, to prevent too many devices communicating with a single network, the control unit 621 may randomly generate a number corresponding to the class of each received synchronization signal and select the network associated with a device having sent the reference synchronization signal corresponding to, e.g., the largest number for D2D communication. Here, instead of randomly generated numbers, the numbers may be generated on the basis of information assigned to the device or terminal (e.g. reference synch device ID, remaining duration for which the device serves as a reference synch device, duration for which the device has served as a reference synch device, remaining battery power, use of GPS-like absolute time, network access). Combinations of the above schemes or other mechanisms may be used to prevent concentration of the load on a single network.

At step 714, the control unit 621 controls the electronic device to operate as a regular device in the selected network. It is necessary for the electronic device operating as a regular device to repeatedly perform resynchronization. For example, as described before in connection with FIGS. 5A to 5C, when a proximate device sending a different reference synchronization signal makes an appearance, the device sending the reference synchronization signal may change the point in time for reference synchronization signal transmission. When the reference synchronization signal changes, the electronic device operating as a regular device may perform resynchronization according to a synchronization signal or reference time change signal provided by the device sending the reference synchronization signal in the network. For low-power operation, resynchronization may be performed within an interval preset by the reference synch device.

At step 720 (mismatch between detected reference synchronization signals), the control unit 621 determines that the detected reference synchronization signals have different reference times, configures the electronic device as a candidate reference synch device, and elects a reference synch device.

Selection of a reference synch device via election or competition may be conducted in various ways. In the description, "election" and "competition" may be used interchangeably. In an embodiment for election or competition, random waiting times are assigned to one or more candidate reference synch devices, and one of the candidate reference synch devices sending a synchronization signal first after its waiting time may become the reference synch device sending a reference synchronization signal. In another embodiment for election or competition, candidate reference synch devices exchange priority values, which are generated by using device-specific parameters (e.g. remaining battery power and expected residence time) or randomly generated parameters, with each other, and one of the candidate reference synch devices showing the highest or lowest value may become the reference synch device. Those candidate reference synch devices not elected as the reference synch device may operate as a regular device. In another embodiment for election or competition, candidate reference synch devices in competition send voting requests to one or more existing devices, and one of the candidate reference synch devices may be elected as the reference synch device according to the responses from the existing devices.

In addition, two or more networks may have already initiated a synchronization process at the time of election of a reference synch device. Hence, the electronic device may be configured to autonomously check whether synchronization is in progress. For example, the electronic device may examine a reference synchronization signal sent by a given reference synch device for two periods or more. If a change is detected in the reference synchronization signal, the electronic device may immediately start to operate as a regular device other than a candidate reference synch device. As another example, the D2D communication scheme may be configured to issue special control information when different networks have already initiated a synchronization process. In this case, upon reception of such control information, the electronic device may not become a candidate reference synch device.

As described above, at step 720, the electronic device may become a reference synch device via election or competition or may remain as a regular device.

At step 722, the control unit 621 checks whether the electronic device is elected as a reference synch device. If the electronic device is elected as a reference synch device, the procedure proceeds to step 724. If the electronic device not elected as a reference synch device, the control unit 621 selects a network to communicate at step 712 and operates as a regular device in the selected network at step 714. Step 712 and step 714 are described before and a description thereof is omitted herein.

At step 724, the control unit 621 configures the electronic device as a reference synch device whose class is set to be lower than or equal to that of the lowest class reference synchronization signal among the detected reference synchronization signals, and the electronic device operates as a reference synch device of that class. Next, a description is given of determining the class for reference signal transmission.

A description is given of the criteria to determine the class when the electronic device is elected as a reference synch device. When an electronic device becomes a reference synch device, it has to determine the class for sending a reference synchronization signal. This may correspond to determining the field to be used for reference synchronization signal transmission in the format shown in FIG. 4A. The following description is given with reference to FIGS. 4A and 4B.

A reference synch device may determine its class for reference synchronization signal transmission on the basis of the classes received or detected reference synchronization signals. When there are in-sync reference synchronization signals of the same class, only one of them will be detected. When there are out-of-sync reference synchronization signals of the same class, two or more of them (with different reference times) will be detected. In the following description, it is assumed that reference synchronization signals of reference synch devices are classified into three classes.

For example, when two or more reference synchronization signals of the first class are detected, this indicates that two or more reference synch devices of the first class are out-of-sync. In this case, as the detected reference synchronization signals are of the same first class, the electronic device may be configured as a reference synch device sending a second class reference synchronization signal.

As another example, when one reference synchronization signal of the first class and two or more out-of-sync reference synchronization signals of the second class are detected, the electronic device may be configured as a reference synch device sending a third class reference synchronization signal.

As another example, when one reference synchronization signal of the first class, one reference synchronization signal of the second class, and two or more out-of-sync reference synchronization signals of the third class are detected, the electronic device may be configured as a reference synch device sending a third class reference synchronization signal.

As another example, when two first class and second class reference synchronization signals with difference reference times are detected, this indicates that the device sending a first class reference synchronization signal and the device sending a second class reference synchronization signal are different in class. In this case, the electronic device may achieve synchronization with one of the first class device and the second class device, and, if a preset condition is satisfied, operate as a reference synch device sending a reference synchronization signal of a class immediately below the class of the device with which it has achieved synchronization. Here, the preset condition may be satisfied when the electronic device is elected as a device sending a reference synchronization signal.

As described above, when two or more reference synchronization signals are detected, the electronic device elected as a reference synch device may set its class to be lower than or equal to those of the detected reference synchronization signals.

Consequently, when detected reference synchronization signals of the same class are out-of-sync, the reference synch device may be preferably assigned a class immediately below the class of the lowest class reference synchronization signal among the detected reference synchronization signals. When, among detected reference synchronization signals, out-of-sync reference synchronization signals are of the lowest class, the reference synch device is assigned the lowest class. When the electronic device operates as a reference synch device of a class set at step 724, it constitutes one network. As described before, after constituting a network, the electronic device may change the point in time for reference synchronization signal transmission so as to achieve synchronization with a proximate device sending a reference synchronization signal with a different reference time. Here, the class of the electronic device may be not changed. As such, it is possible to achieve synchronization between electronic devices sending reference synchronization signals in corresponding networks in a distributed manner.

In addition, when the electronic device attempts to operate as a reference synch device of a given class at step 724, it may check whether the synchronization resource of the sync frame of the class is used by an existing synchronization device. If the synchronization resource of the sync frame of the class is not used (empty), the electronic device may send a synchronization signal at the sync frame. Utilization of a specific sync frame may be examined by the reception power of a synchronization signal from an existing synchronization device. As another example, when the sync frame of a specific class may be used by multiple synchronization devices, the electronic device may examine all the synchronization resources associated with the sync frame, and, if an empty synchronization resource is present, use the empty synchronization resource. If an empty synchronization resource is not present, as the electronic device cannot operate as a reference synch device, at step 714, it operates as a regular device.

A brief description is given of performing synchronization in a distributed manner. In one embodiment, synchronization times of out-of-sync reference synch devices are examined, and distributed synchronization may be performed using the average of differences between the synchronization times. In another embodiment, synchronization times of out-of-sync reference synch devices are examined, and synchronization may be performed with respect to the synchronization time of the reference synch device having the earliest synchronization time. In another embodiment, synchronization times of out-of-sync reference synch devices are examined, and synchronization may be performed with respect to the output of a predefined function taking the examined synchronization times as input. In another embodiment, when a reference synch device capable of obtaining absolute reference synchronization through communication with a satellite or synchronous mobile communication network is present among out-of-sync reference synch devices, synchronization may be performed with respect to the synchronization time of the reference synch device capable of obtaining absolute reference synchronization. To this end, exchanged synchronization signals may include an indication to availability of absolute reference synchronization.

Meanwhile, after being configured as a reference synch device at step 720 and/or at step 704, the electronic device may switch its role to a regular device. Next, a description is given of a case where a reference synch device is switched to a regular device in connection with step 720. However, in connection with step 704, a reference synch device may also be switched to a regular device in an identical or similar manner.

After having been elected as a reference synch device, to terminate the role of a reference synch device, the electronic device may broadcast a retirement message so that other electronic devices may initiate an election process.

Use of such a retirement process may permit a portable device using a battery, among electronic devices performing D2D communication, to reduce the risk of network loss due excessive battery consumption. In one embodiment, to elect a device sending a reference synchronization signal without election or retirement, candidate reference synch devices may send synchronization signals and priority values, and other devices may receive the synchronization signals and priority values and regard the candidate reference synch device having sent the highest priority value as a device sending a reference synchronization signal. In another embodiment, candidate reference synch devices may be configured to exchange information with each other through broadcasting and elect a new reference synch device accordingly.

FIGS. 8A to 8F illustrate situations where synchronization signals are sent so as to achieve synchronization between D2D networks according to an embodiment of the present invention.

Figure 8A:
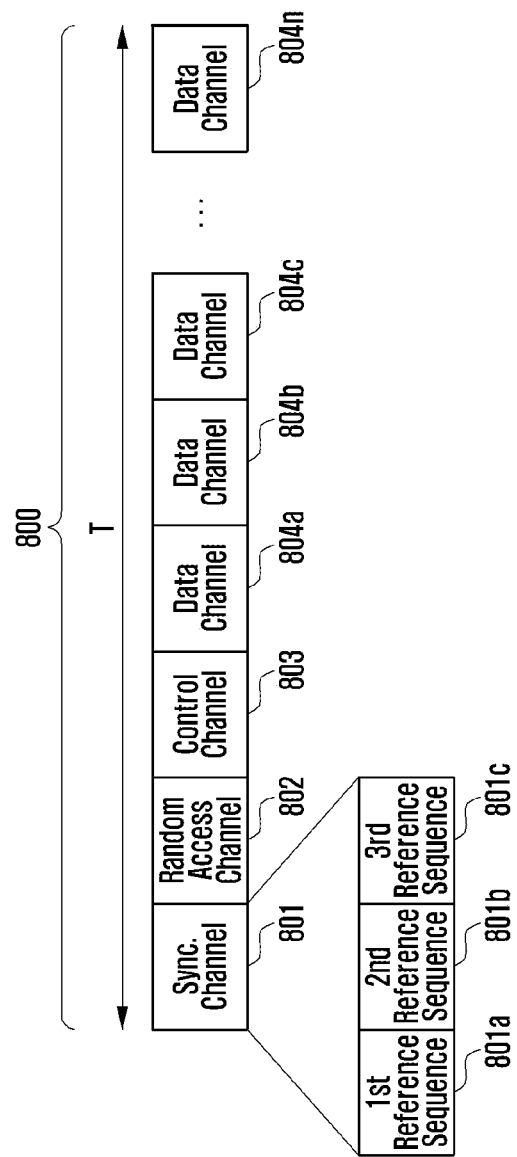

FIG. 8A shows one packet or frame period for synchronization signal transmission according to an embodiment of the present invention. In the following description, it is assumed that one frame is sent per one period to transmit a synchronization signal.

Referring to FIG. 8A, a first reference sequence 801$a$, second reference sequence 801$b$ and third reference sequence 801$c$ may be sent on the synchronization channel 801. The position of each reference sequence may correspond to the class described above. For example, a first class reference synchronization signal may be sent at the position of the first reference sequence 801$a$; a second class reference synchronization signal may be sent at the position of the second reference sequence 801$b$; and a third class reference synchronization signal may be sent at the position of the third reference sequence 801$c$.

In addition, the frame may include a random access channel 802 and a control channel 803. The frame may further include data channels 804$a$, 804$b$, 804$c$, ..., 804$n$, on which D2D data may be sent and received. Regular devices in a network may achieve synchronization in a centralized manner by use of a synchronization signal or reference sequence sent on the synchronization channel 801. When a message is used instead of a sequence, the message should contain information corresponding to the first to third indexes or positions.

A description is given of inter-network synchronization with reference to FIGS. 8B to 8F.

Figure 8B:
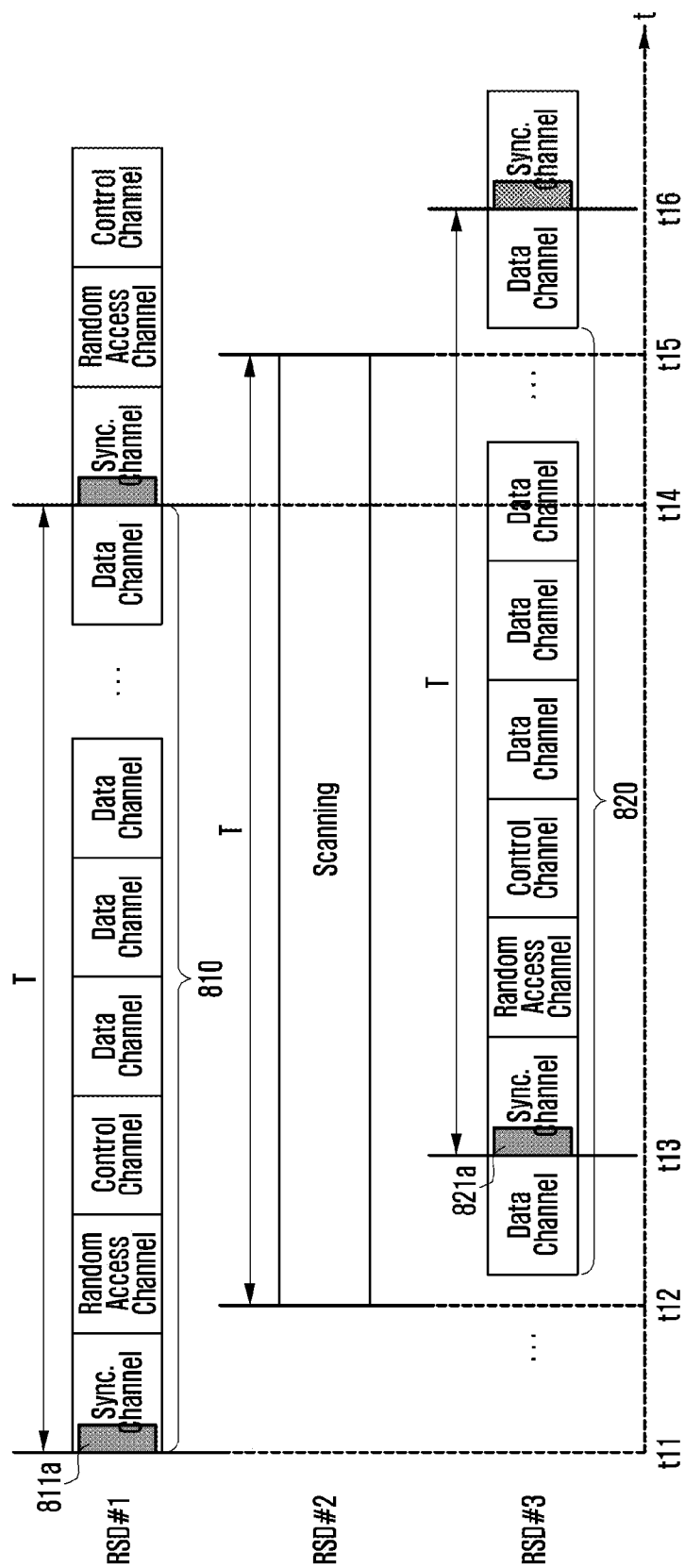

In FIG. 8B, a first reference synch device (RSD#1) may send a synchronization signal or reference sequence to devices in the corresponding network on the synchronization channel at time t11. A third reference synch device (RSD#3) may send a synchronization signal or reference sequence to devices in the corresponding network on the synchronization channel at time t13. Here, it is assumed that the first reference synch device and the third reference synch device cannot directly exchange a signal and there is an overlapped area between the networks of the first reference synch device and the third reference synch device.

A second reference synch device (RSD#2) placed in the overlapped area scans reference signals for a preset time (e.g. one frame period T). In FIG. 8B, it is assumed that scanning is conducted from time t12 to time t15. At time t13, the second reference synch device may receive a first class reference synchronization signal or reference sequence sent by the third reference synch device. The second reference synch device may also receive a first class reference synchronization signal or reference sequence sent by the first reference synch device at time t14.

When there are two or more devices receiving two out-of-sync reference synchronization signals, one of the devices may be elected as a reference synch device as described before.

Figure 8C:
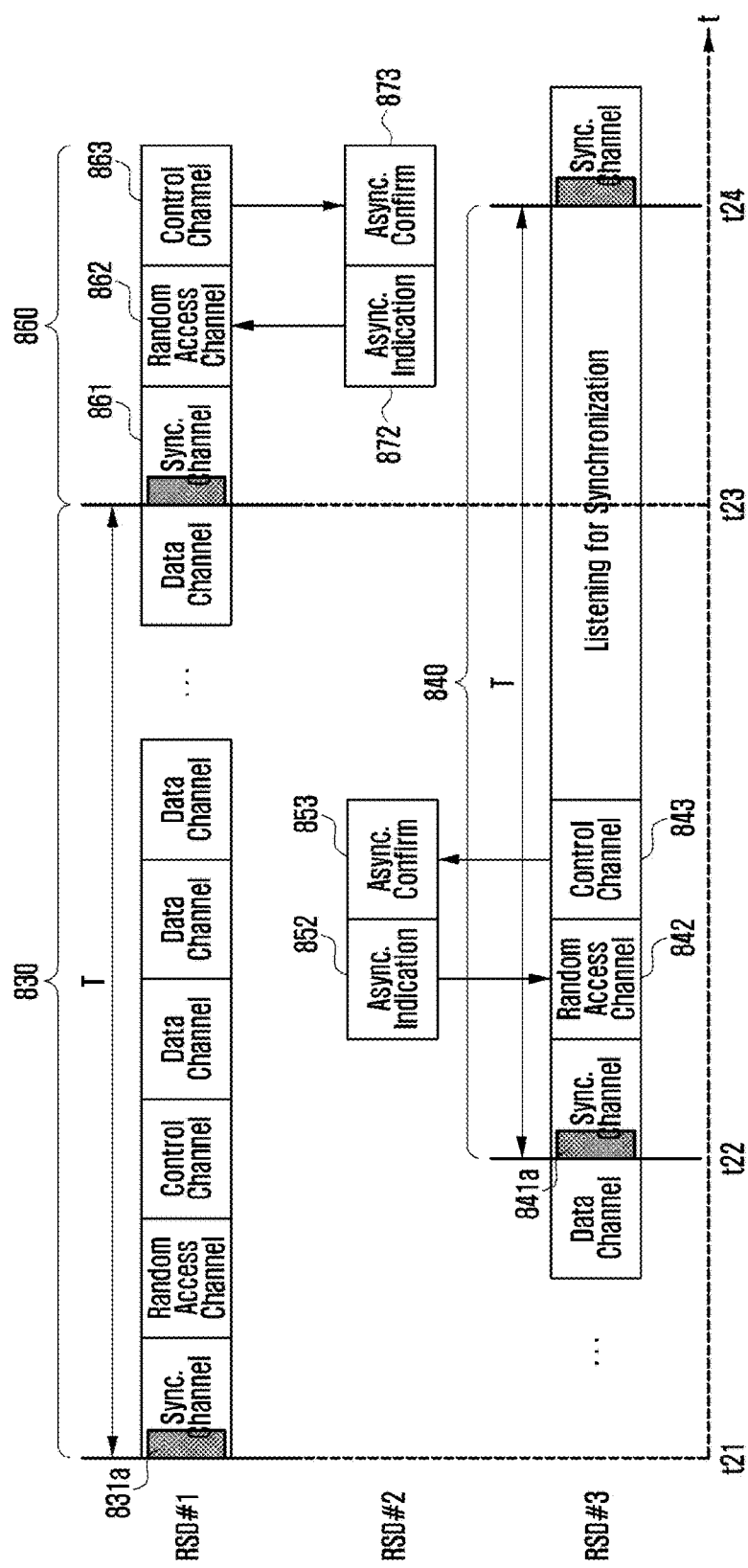

To continue the description with reference to FIG. 8C, the second reference synch device (RSD#2) receives the synchronization channel sent by the third reference synch device (RSD#3) at time t22 and sends an asynchronization indication 852 on the random access channel 842 of the third reference synch device. Here, the asynchronization indication 852 may indicate a synchronization mismatch between the third reference synch device and the first reference synch device.

Upon reception of the asynchronization indication 852, the third reference synch device may notify recognition of an out-of-sync situation by sending the second reference synch device an asynchronization confirmation 853 on the control channel 843. Thereafter, for distributed synchronization between networks, the third reference synch device may wait for receiving a synchronization signal without sending data. However, the third reference synch device may send a reference synchronization signal at a prescheduled point in time for synchronization signal transmission like time t24.

In addition, the second reference synch device (RSD#2) receives the synchronization channel sent by the first reference synch device (RSD#1) at time t23 and sends an asynchronization indication 872 on the random access channel 862 of the first reference synch device. Here, the asynchronization indication 872 may indicate a synchronization mismatch between the third reference synch device and the first reference synch device.

Upon reception of the asynchronization indication 872, the first reference synch device may notify recognition of an out-of-sync situation by sending the second reference synch device an asynchronization confirmation 873 on the control channel 863. Thereafter, for distributed synchronization between networks, the first reference synch device may wait for receiving a synchronization signal without sending data. However, the first reference synch device may send a reference synchronization signal at a prescheduled point in time for synchronization signal transmission.

Figure 8D:
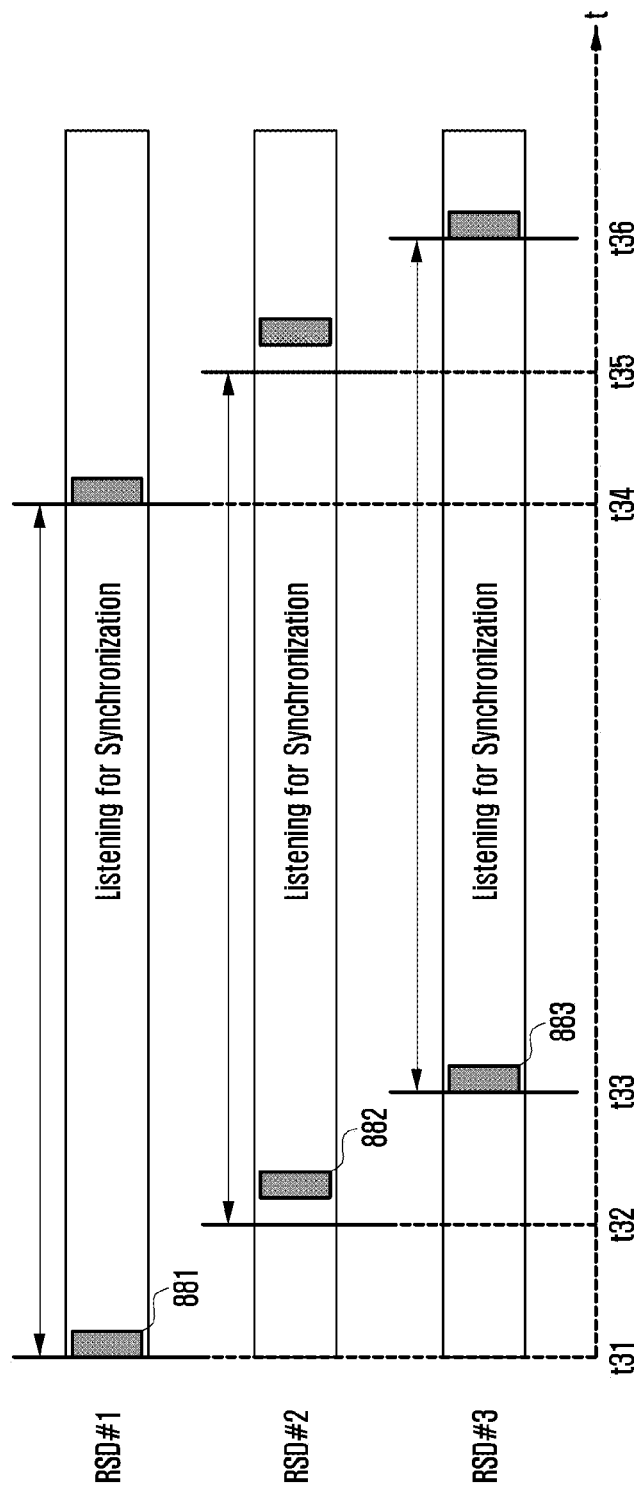

Referring to FIG. 8D, after inter-network synchronization in a distributed manner, the first reference synch device (RSD#1), the second reference synch device (RSD#2) and the third reference synch device (RSD#3) may send reference synchronization signals 881, 882 and 883 corresponding to their classes at frame start times t31, t32 and t33, respectively. In the remaining interval, the first reference synch device (RSD#1), the second reference synch device (RSD#2) and the third reference synch device (RSD#3) perform channel scanning to receive synchronization signals. This process may be performed once or several times according to implementations of inter-network synchronization. In FIG. 8D, times t34, t35 and t36 indicate repetition of the above process. For low-power operation, the scanning interval may be provided on a periodic basis for each network.

FIG. 8D illustrates achievement of synchronization between the first reference synch device, the second reference synch device, and the third reference synch device through the above process. That is, time t41 and time t42 may be the frame start time for all the first reference synch device, the second reference synch device, and the third reference synch device.

Figure 8F:
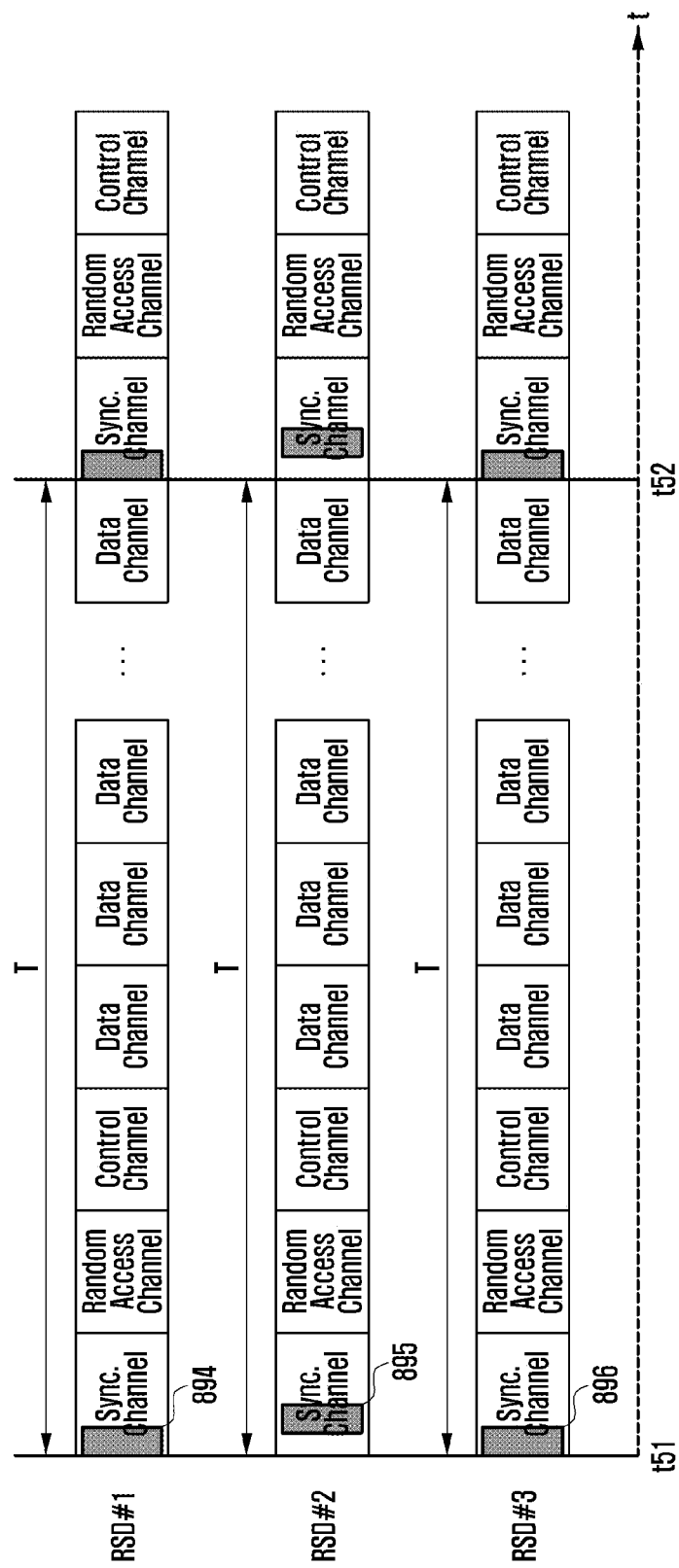

FIG. 8F illustrates data transmission/reception in individual networks after synchronization. Here, all the first reference synch device, the second reference synch device, and the third reference synch device are synchronized at time t51 and time t52. The first reference synch device, the second reference synch device, and the third reference synch device may send reference synchronization signals 894, 895 and 896 corresponding to their classes on their synchronization channels, respectively.

Next, a description is given of synchronization between D2D networks by sending synchronization signals with reference to FIGS. 9A to 9D.

FIGS. 9A to 9D illustrate situations where synchronization signals are sent so as to achieve synchronization between D2D networks according to another embodiment of the present invention.

Figure 9A:
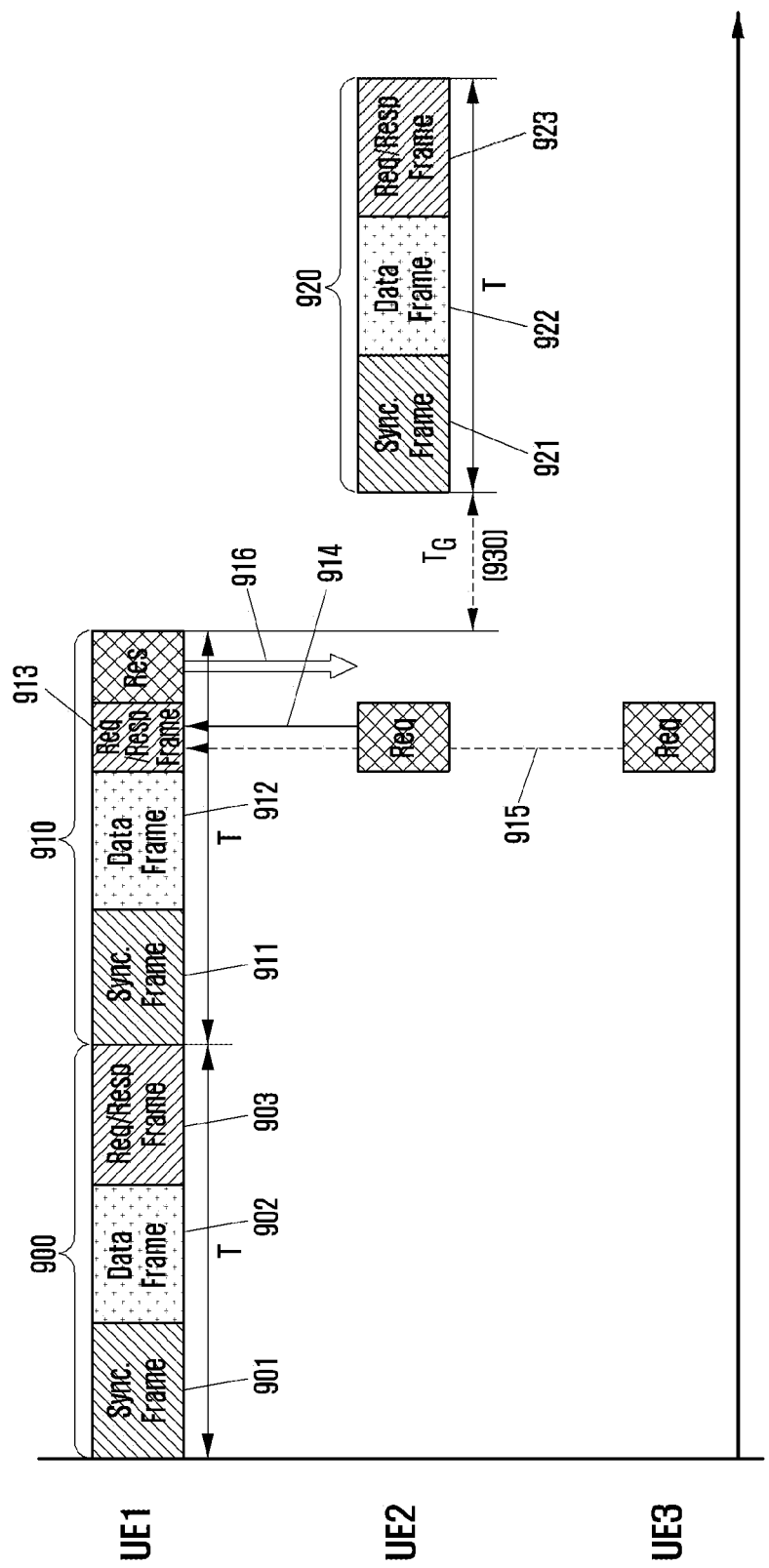
FIGS. 9A to 9D illustrate situations where synchronization signals are sent so as to achieve synchronization between D2D networks according to another embodiment of the present invention.

In FIG. 9A, there are three different devices or user equipments (UE1, UE2 and UE3), and the three devices are placed in one network (e.g. first network 10 or second network 20 in FIG. 1A).

To communicate with each other, the devices (UE1, UE2 and UE3) have to elect a device sending a reference signal and be synchronized with the elected device. To this end, as shown in FIG. 9A, the first device (UE1) may send one frame including a sync frame for one period T. Here, the first device (UE1) monitors radio resources first for a given duration, and, if no synchronization or sequence signal is received, may change its role to a reference synch device and start to send a synchronization or sequence signal.

If a synchronization or sequence signal is received, to become a reference synch device, the first device (UE1) may send a request signal to the existing reference synch device. In FIG. 9A, the second device (UE2) and the third device (UE3) may be an existing reference synch device having sent a reference synchronization or sequence signal.

As shown in FIG. 9A, a device sending a reference synchronization signal (e.g. the first device) may send a frame for one period T. For example, the first frame 900 may be composed of a sync frame 901, a data frame 902, and a request/response frame 903.

Here, the data frame 902 may be used to exchange data with other devices such as the second device (UE2) and third device (UE3). The request/response frame 903 may be used by a device wishing to be a reference synch device to send a request signal, or may be used by another device (in reply to a request signal) to send a response signal indicating the device selected as a reference synch device.

As shown in FIG. 9A, after sending the first frame 900, the first device (UE1) may send a second frame 910. This is because the first device has failed to receive a request signal from other devices (UE2 and UE3) after sending the first frame 900. However, during the second frame period 910, the first device may receive a request signal from the second and third devices (UE2 and UE3) as indicated by indicia 914 and 915.

Upon reception of the request signals 914 and 915 from the second and third devices, as two or more request signals are received, the first device has to select one of the second and third devices as device sending a reference synchronization signal. In FIG. 9A, the second device (UE2) is depicted as being selected as a device sending a reference synchronization signal at the next point in time. That is, the first device may send a response signal to the second device as indicated by indicia 916. Thereafter, the device having received a response signal may be become a device sending a reference synchronization signal.

Hence, the second device (UE2) may send a frame 920 composed of a sync frame 921, a data frame 922, and a request/response frame 923 for one period T. Here, the data frame 922 may be used to exchange data with other devices (UE1 and UE3). The request/response frame 923 may be used to exchange signals with other devices (UE1 and UE3) as described above in connection with the second frame 910.

Unlike the preceding examples, the second device (UE2) sending a reference synchronization signal at the next point in time may use a reference time different from that at the preceding point in time. For example, the first frame 900 and the second frame 910 are sent according to the reference time selected by the first device, and the second device sending the third frame 920 may use a reference time different from that of the first device. In FIG. 9A, a time gap ($T_G$) 930 indicates such a change in reference time. That is, in the scheme of FIG. 9A, individual devices (UE1, UE2 and UE3) may use separate reference times for reference signal transmission and frame composition, and a proximate device may perform data reception in synchronization with a reference signal sent by a device sending a reference signal.

In addition, the third device (UE3) may also receive a response signal 916 from the first device selecting the second device as a device sending a reference synchronization signal at the next point in time. Hence, the third device (UE3) may be aware that it is not selected as a device sending a reference synchronization signal at the next point in time.

Selection (or election) of a device sending a reference synchronization signal from among individual devices such as UE1, UE2 and UE3 may be performed on a periodic basis (e.g. 1T, 2T or 4T). To preserve fairness in selecting (or electing) a device sending a reference synchronization signal from among individual devices, it is possible to use a randomly generated value. In addition, for selecting a device sending a reference synchronization signal at the next point in time, it is possible to consider various factors, such as remaining battery power information of a device sending a request signal or received signal strength information indicating electromagnetic wave environments.

Figure 9B:
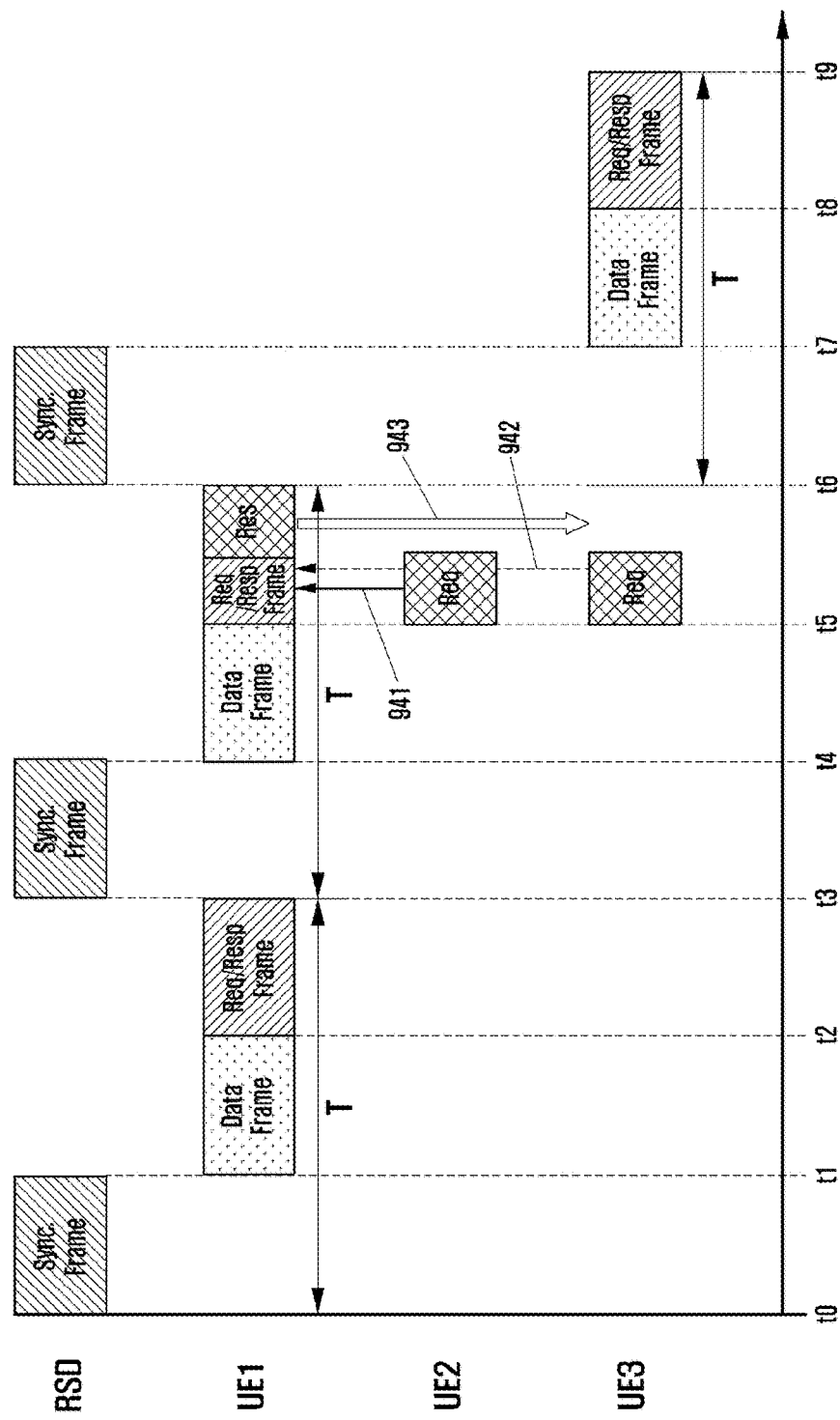

FIG. 9B is a timing diagram for data transmission and reception in the presence of an electronic device sending a reference signal.

As shown in FIG. 9B, the device sending a reference synchronization signal (RSD) may send a reference synchronization signal according to a preset period T. Devices (UE1, UE2 and UE3), placed at locations to which a reference synchronization signal from the reference synch device can be transmitted, may exchange data with each other in synchronization with a reference synchronization signal from the reference synch device. Hence, the devices (UE1, UE2 and UE3) may constitute one network with respect to the reference synch device sending a reference synchronization signal.

In FIG. 9B, a first period spans from time t0 to time t3, a second period spans from time t3 to time t6, and a third period spans from time t6 to time t9.

Referring to FIG. 9B, the first device (UE1) may send data during the data frame time of the first period (from time t1 to time t2) and during the data frame time of the second period (from time t4 to time t5). To obtain the right to send data, the second device (UE2) and the third device (UE3) may send a request signal to the first device at time t5 as indicated by indicia 941 and 942. Upon reception of the request signals 941 and 942, the first device may select one of the received request signals 941 and 942 for a device sending data during the next period. For example, the third device (UE3) is selected as a device sending data during the next period. Hence, the first device sends a response signal 943 to the third device, which may then send data during the data frame time of the third period (from time t7 to time t8).

Here, when the first device selects a device sending data during the next period on the basis of two or more received request signals, it may select such a device at random or in consideration of information contained in the request signals. For example, such selection may be made at random or in consideration of the priority associated with the QoS level or the amount of data to be sent. Likewise, when the first device sends a response signal at time t5, a fourth device (UE4, not shown) may also send a response signal. Upon reception of two or more response signals, the second device and the third device having sent a request signal may make a determination to become a device sending data during the next period on the basis of information contained in the response signals. For example, such determination may be made in consideration of a random number contained in the response signal, the priority associated with a device ID contained in the response signal, or the priority associated with QoS information contained in the response signal.

Figure 9C:
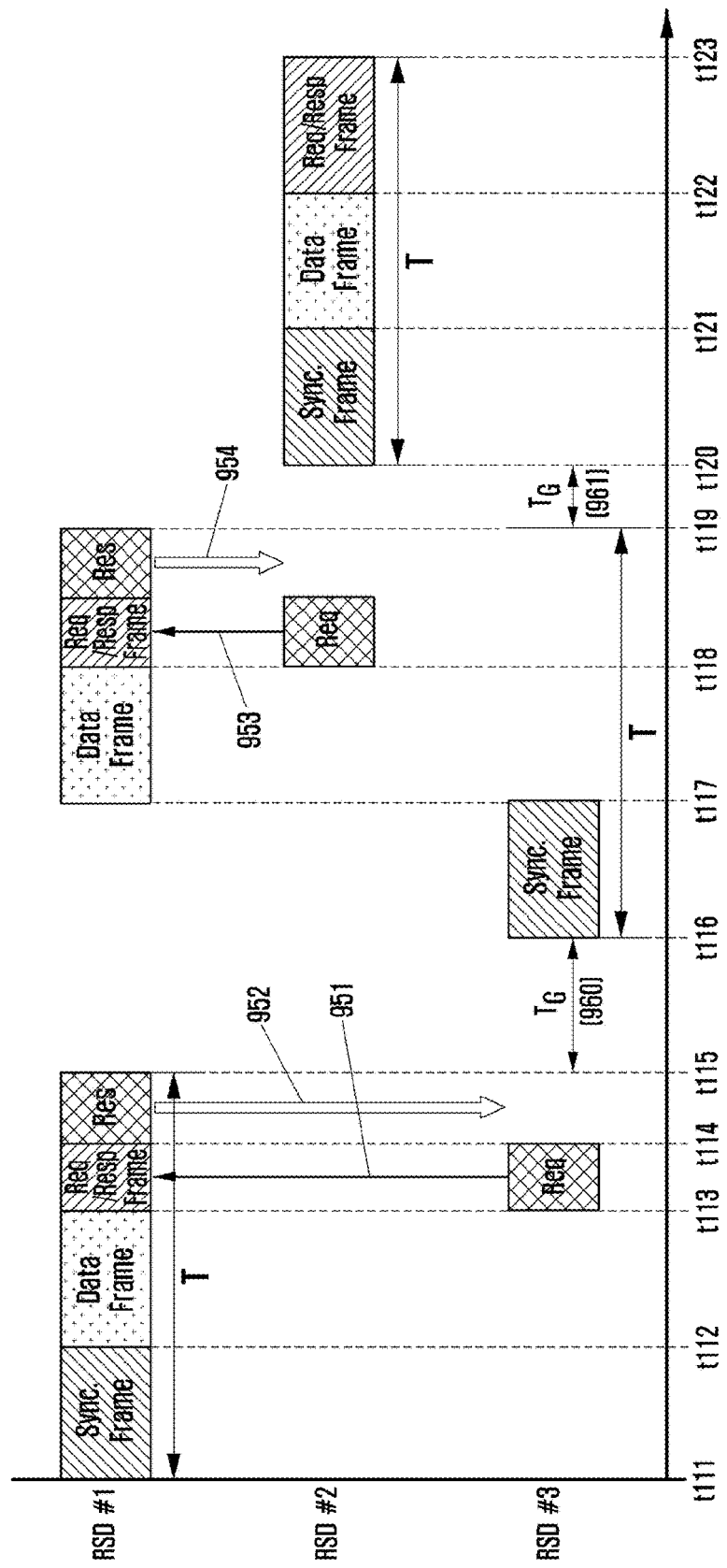

Next, a description is given of synchronization between electronic devices according to another embodiment of the present invention. FIG. 9C illustrates a process of synchronization between electronic devices according to another embodiment of the present invention.

The devices sending a reference synchronization signal in FIG. 9C may correspond respectively to the devices shown in FIG. 2C and FIG. 2D. In the following description, it is assumed that a first reference synch device (RSD #1) corresponds to the device 101 in FIGS. 2C and 2D, a second reference synch device (RSD #2) corresponds to the device 201 in FIGS. 2C and 2D, and a third reference synch device (RSD #3) corresponds to the device 301 in FIGS. 2C and 2D.

Under the above assumption, the first reference synch device (RSD #1) and the second reference synch device (RSD #2) cannot directly exchange a signal. That is, the first reference synch device and the second reference synch device may have different reference times for synchronization signals. Below, it is assumed that the first reference synch device and the second reference synch device have different reference times.

The third reference synch device (RSD #3) may receive a signal from the first reference synch device and the second reference synch device. As the third reference synch device receives synchronization signals with different reference times from the first reference synch device and the second reference synch device, it may be aware that the first reference synch device and the second reference synch device have different reference times.

Here, the third reference synch device (RSD #3) may send the reference synch device (RSD #1) a request signal 951 requesting transfer of the right to send a reference signal during the request/response frame time of a given period (from time t111 to time t115) in synchronization with the reference time of the first reference synch device. In reply to the request signal 951, the first reference synch device may send a response signal 952, enabling the third reference synch device to send a reference synchronization signal.

In the same way as taking over the right to send a reference signal from the first reference synch device, the third reference synch device may take over the right to send a reference signal from the second reference synch device.

Thereafter, the third reference synch device may send a sync frame with a delayed time $T_G$ 960 (time t116) after expiration of the period of the first reference synch device (time t115). This may correspond to the case of FIG. 9B where there is an electronic device sending a specific reference signal.

As described above, when the third reference synch device sends a reference synchronization signal, the first reference synch device and the second reference synch device may receive the reference synchronization signal from the third reference synch device. As shown in FIG. 9C, for data transmission and reception, the first reference synch device may send and receive data for a duration from time t117 to time t118 in synchronization with the sync frame sent at time t116. Additionally, during a period in which the third reference synch device sends a reference signal, the other devices may exchange request and response signals so as to determine a device sending a reference signal during the next period as indicated by indicia 953 and 954.

Further, in FIG. 9C, after transferring the right to send a reference signal to the third reference synch device, the first reference synch device may still take part in determining or selecting a reference synch device. Hence, the first reference synch device may be an agent to determine a device sending a reference signal during the next period as indicated by indicia 953 and 954. That is, upon reception of a request signal requesting transfer of the right to send a reference signal from the second reference synch device as indicated by indicia 953, the first reference synch device may send a response signal as indicated by indicia 954.

Meanwhile, when reference signals are received from the first reference synch device and second reference synch device, regular devices (e.g. devices belonging to the first network 100 or the second network 200 of FIG. 2C and only receiving data) may operate in synchronization with the highest-class reference signal among the received reference signals. Repeating the above process may achieve synchronization between reference synch devices in distributed manner.

Figure 9D:
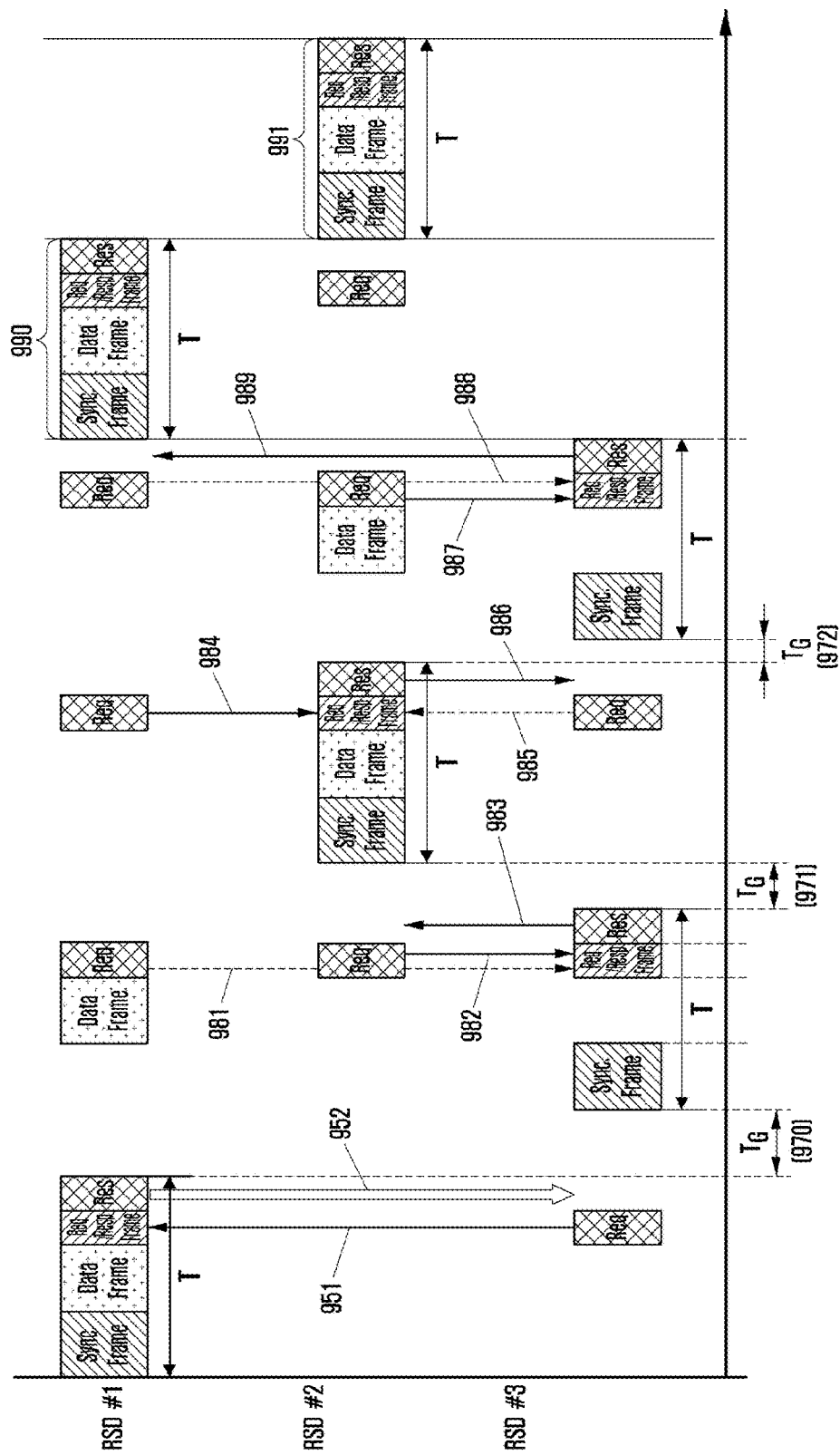

FIG. 9D illustrates a process of synchronization between electronic devices according to another embodiment of the present invention.

The process of FIG. 9D may be similar to that of FIG. 9C except for the newly elected third reference synch device that may perform an action to determine the next device sending a reference signal. A further description is given with reference to FIG. 9C.

In the above description on FIG. 9C, assuming the case of FIG. 2C, the first reference synch device (RSD #1) is configured to determine a device sending a reference synchronization signal in the first network 100, and the second reference synch device (RSD #2) is configured to determine a device sending a reference synchronization signal in the second network.

In FIG. 9d, the third reference synch device (RSD #3) takes over the right to send a reference signal from the first reference synch device (RSD #1) and the second reference synch device (RSD #2). For example, the third reference synch device may send a request signal requesting transfer of the right as indicated by indicia 951 and receive a response signal from the first reference synch device as indicated by indicia 952. Here, note that a similar process for taking over the right from the second reference synch device is omitted in FIG. 9D.

After taking over the right to send a reference signal, the third reference synch device may wait for a given delay time ($T_G$) 970 and send a sync frame to the first reference synch device and the second reference synch device. Thereafter, the third reference synch device may receive request signals requesting transfer of the right to send a reference signal from the first reference synch device and the second reference synch device as indicated by indicia 981 and 982. Upon reception of two or more transfer requests, the third reference synch device may select one of the requests to transfer the right to send a reference signal. As described before in connection with FIG. 9A, the device having the right to send a reference signal may be changed on a periodic basis of one or several periods.

When the right to send a reference signal is transferred, the right to send data may also be transferred or may not be transferred according to the classes of the devices. For example, when the right to send a reference signal is transferred between devices of the same class, the right to send data may also be transferred. On the other hand, when the right to send a reference signal is transferred from a device of a high class to a device of a low class, the right to send data may be still owned by the device of a high class.

Regular devices receiving data may operate in synchronization with a reference sequence of a higher class. When two synchronization signals of different classes are received, a regular device may perform data transmission and reception in synchronization with the synchronization signal of a higher class.

As the right to send a reference signal is transferred between different devices on a periodic basis of one or several periods, the time gap $T_G$ between sync frames of different reference synch devices is gradually reduced as indicated by indicia 970, 971 and 972, achieving synchronization between all devices later.

After achieving synchronization between all devices, to reduce network load, it is possible to disallow transfer of the right to send a reference signal or to disallow transfer of the right for a given duration significantly Longer than the time required to achieve synchronization (e.g. several minutes, dozens of minutes, or several hours). In the above description, reference synch devices sending a reference signal are assumed to operate using the same frequency resources. However, reference synch devices do not have to operate using the same frequency resources. For example, reference signals may include an indication to the used frequency resource. In D2D communication described above, when the transmit power of a near device is greater than that of a far device, although the near device and the far device use different frequencies, signal reception may encounter difficulties owing to severe interference between frequencies.

In the case of group communication between devices belonging to the same group, there is a half-duplex limitation whereby a device performing transmission cannot receive a signal on a different frequency resource at the same time. To overcome this problem, the synchronization signal may be sent and received through common frequency resources, and a proximate device receiving the synchronization signal may identify the frequency resource being used and operate using an unused frequency resource. Here, the common frequency resources may include one frequency resource, multiple frequency resources, or all the frequency resources.

In various embodiments of the present invention, frequency resources used for synchronization signals do not necessarily coincide with frequency resources used for data transmission. A synchronization signal may include resource information by using a portion of the synchronization sequence information to indicate resource information. For example, the two low-order digits of the sequence information ranging from 0000 to 1111 may be used to identify four resources. A synchronization signal may include resource information in a message form. Here, the resource information may denote frequency resources, time resources, or frequency-time resources.

Reference synchronization signals may be realized at the physical layer (L1 layer 612 in FIG. 6) or at the MAC layer (L1 layer 611 in FIG. 6). A reference synchronization signal realized at the physical layer and a reference synchronization signal realized at the MAC layer are the same in overall operation and structure except for some differences. In physical layer implementation, a synchronization signal is sent as a sequence at a preset time in the frame structure. In this case, the reference synch device may fail to receive a synchronization signal when performing transmission other than synchronization. To resolve such a problem, it may be necessary to periodically chance the role of the reference synch device.

In MAC layer implementation, a synchronization signal is sent as a beacon, and time information may be included in the beacon as a message. As beacons are sent via CSMA/CA for examining occupation of resources, there is no collision between beacons, but at the cost of transmission delay. The beacon contains time information considering delay time, and a device receiving the beacon computes the original time in consideration of the delay time. Hence, there is no problem in relation to distributed synchronization between reference synch devices and synchronization of regular devices.

In a feature of the present invention, it is possible to efficiently achieve synchronization in D2D networks. The method and apparatus of the present invention may achieve synchronization between electronic devices for wireless communication in a manner independent of an absolute synchronization system such as a synchronous base station or GPS, and may provide mixed centralized/distributed synchronization mechanisms. Thereby, it is possible to apply centralized synchronization and distributed synchronization in combination to one-to-one or one-to-many communications in D2D networks, satisfying stability requirements and efficiency requirements at the same time.

Hereinabove, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

INDUSTRIAL APPLICABILITY

The present invention may be utilized to achieve synchronization in a system for wireless communication.

What is claimed is:

1. A method of synchronization for a first electronic device performing wireless communication with a second electronic device and a third electronic device, the method comprising:
checking, when a first reference synchronization signal is received from the second electronic device and a second reference synchronization signal is received from the third electronic device are both received within a preset period, whether the received first reference synchronization signal and the received second reference synchronization signal are synchronized;
determining, when the received first reference synchronization signal and the second reference synchronization signal are not synchronized, to operate as a device sending a third reference synchronization signal of a class lower than or equal to that of a lowest class reference synchronization signal among the received first reference synchronization signal and the received second reference synchronization signal;
sending, upon determining to operate as the device sending the third reference synchronization signal, the third reference synchronization signal at a preset time in a synchronization frame designed to preserve temporal orthogonality between classes; and
performing synchronization between reference synchronization signals in cooperation with the second electronic device and the third electronic device that sent reference synchronization signals.

2. The method of claim 1, wherein performing synchronization between reference synchronization signals comprises:
sending an asynchronization indication to the second electronic device and the third electronic device; and
performing, when an asynchronization confirmation is received from the second electronic device and the third electronic device, synchronization in a network-distributed manner.

3. The method of claim 1, wherein determining to operate as the device sending the third reference synchronization signal comprises setting a random waiting time and determining, when a reference synchronization signal of a same class as the first electronic device is not received within the waiting time, to operate as the device sending the reference synchronization signal.

4. The method of claim 1, wherein the third reference synchronization signal in the synchronization frame comprises one of a sequence sent at an L1 layer and a beacon sent at an L2 layer.

5. The method of claim 1, further comprising selecting, when the received first reference synchronization signal and the received second reference synchronization signal are synchronized, a network that sent one of the first reference synchronization signal and the second reference synchronization signal to initiate communication.

6. The method of claim 5, wherein selecting the network comprises one of selecting a network constituted by a device that sent a synchronization signal with a highest reception power, selecting a network constituted by a device that sent a synchronization signal of a highest class, and selecting a network constituted by a device that sent a synchronization signal corresponding to a generated random number indicating one of the classes.

7. The method of claim 1, further comprising:
determining, when no reference synchronization signal is received within the preset period, to operate as a reference synch device of a highest class;
generating a reference synchronization signal of the highest class; and
sending the generated reference synchronization signal.

8. The method of claim 1, further comprising broadcasting, when the device operating as a reference synch device satisfies a preset condition, a retirement message to a corresponding network so that one of other devices belonging to the corresponding network is elected as the reference synch device.

9. A method of synchronization for an electronic device performing wireless communication with other electronic devices, the method comprising:

sending a reference synchronization signal at one of a plurality of preset points in time in a synchronization frame designed to preserve temporal orthogonality between classes;

sending, when an asynchronization indication sent by a second device, indicating a mismatch between the reference synchronization signal and a reference synchronization signal sent by a third device is received from the second device, an asynchronization confirmation by the third device to the second device to notify recognition of an out-of-sync situation;

performing synchronization together with the third device in a network-distributed manner; and broadcasting, when the device operating as a reference synch device satisfies a preset condition, a retirement message to a corresponding network so that one of other devices belonging to the corresponding network is elected as a reference synch device.

10. The method of claim 9, wherein the reference synchronization signal in a synchronization frame comprises one of a sequence sent at an L1 layer and a beacon sent at an L2 layer.

11. An apparatus of synchronization for a first electronic device performing wireless communication with a second electronic device and a third electronic device, comprising:

a transceiver configured to perform wireless communication with different devices and send a reference synchronization signal; and a processor configured to:

check, when a first reference synchronization signal is received from the second electronic device and a second reference synchronization signal is received from the third electronic device are both received through the transceiver within a preset period, whether the received first reference synchronization signal and the received second reference synchronization signal are synchronized, determine, when the received first reference synchronization signal and the second reference synchronization signal are not synchronized, to operate as a device sending a third reference synchronization signal of a class lower than or equal to that of a lowest class reference synchronization signal among the received first reference synchronization and the received second reference synchronization signal, control, upon determining to operate as the device sending the third reference synchronization signal, the transceiver to send the third reference synchronization signal at a preset time in a synchronization frame designed to preserve temporal orthogonality between classes, and perform synchronization between reference synchronization signals in cooperation with the second electronic device and the third electronic device that sent reference synchronization signals.

12. The apparatus of claim 11, wherein to perform synchronization between reference synchronization signals comprises the processor is further configured to:

control the transceiver to send an asynchronization indication to the second electronic device and the third electronic device, and perform, when an asynchronization confirmation is received from the second electronic device and the third electronic device, synchronization in a network-distributed manner.

13. The apparatus of claim 11, wherein to determine to operate as the device sending the third reference synchronization signal comprises the processor is further configured to:

set a random waiting time, and determine, when a reference synchronization signal of a same class as the first electronic device is not received via the transceiver within the waiting time, to operate as the device sending the reference synchronization signal.

14. The apparatus of claim 11, wherein the reference synchronization signal in the synchronization frame comprises one of a sequence sent at an L1 layer and a beacon sent at an L2 layer.

15. The apparatus of claim 11, wherein, when the reference synchronization signal and the received second reference synchronization signal received via the transceiver are synchronized, the processor is further configured to select a network that sent one of the first reference synchronization signal and the second reference synchronization signal to initiate communication.

16. The apparatus of claim 15, wherein to select the network comprises the processor is further configured to perform one of selecting a network constituted by a device that sent a synchronization signal with a highest reception power, selecting a network constituted by a device that sent a synchronization signal of a highest class, and selecting a network constituted by a device that sent a synchronization signal corresponding to a generated random number indicating one of the classes.

17. The apparatus of claim 11, wherein when no reference synchronization signal is received within the preset period the processor is further configured to:

determine to operate as a reference synch device of a highest class, generate a reference synchronization signal of the highest class, and control the transceiver to send the generated reference synchronization signal.

18. The apparatus of claim 11, wherein, when the device operating as a reference synch device satisfies a preset condition, the processor is further configured to control the transceiver to broadcast a retirement message to a corresponding network.

19. An apparatus of synchronization for an electronic device performing wireless communication with other electronic devices, comprising:

a transceiver configured to perform wireless communication with different devices and send a reference synchronization signal; and a processor configured to:

control the transceiver to send the reference synchronization signal at one of preset points in time in a synchronization frame designed to preserve temporal orthogonality between classes, control, when an asynchronization indication sent by a second device, indicating a mismatch between the reference synchronization signal and a reference synchronization signal sent by a third device is received from the second device, sending an asynchronization confirmation by the third device to the second device to notify recognition of an out-of-sync situation, perform synchronization together with the third device in a network-distributed manner, and when the device operating as a reference synch device satisfies a preset retirement condition, control the transceiver to broadcast a retirement message to a corresponding network.

20. The apparatus of claim 19, wherein the reference synchronization signal in a synchronization frame comprises one of a sequence sent at an L1 layer and a beacon sent at an L2 layer.

* * * * *